US012658764B2

(12) United States Patent
Warren et al.

(10) Patent No.: US 12,658,764 B2
(45) Date of Patent: Jun. 16, 2026

(54) HIGH CURRENT DENSITY ELECTRIC MACHINE

(71) Applicant: SIEMENS ENERGY, INC., Orlando, FL (US)

(72) Inventors: Bobby A Warren, Fort Mill, SC (US); Raul Ricardo Rico, Oviedo, FL (US); Christopher Lowry, McAdenville, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 192 days.

(21) Appl. No.: 18/689,128

(22) PCT Filed: Sep. 28, 2021

(86) PCT No.: PCT/US2021/052431
§ 371 (c)(1),
(2) Date: Mar. 5, 2024

(87) PCT Pub. No.: WO2023/055343
PCT Pub. Date: Apr. 6, 2023

(65) Prior Publication Data
US 2024/0405640 A1 Dec. 5, 2024

(51) Int. Cl.
*H02K 9/18* (2006.01)
*H02K 7/08* (2006.01)
*H02K 7/18* (2006.01)

(52) U.S. Cl.
CPC .............. *H02K 9/18* (2013.01); *H02K 7/083* (2013.01); *H02K 7/1823* (2013.01)

(58) Field of Classification Search
CPC ........ H02K 9/18; H02K 7/083; H02K 7/1823; H02K 1/32; H02K 3/24; H02K 9/19; H02K 9/10
See application file for complete search history.

(56) References Cited

U.S. PATENT DOCUMENTS 2,862,119 A 11/1958 Else et al.
2,873,393 A * 2/1959 Baudry .................... H02K 9/12
310/55

(Continued)

FOREIGN PATENT DOCUMENTS

CN 110994906 A 4/2020
DE 1776174 A1 2/1972

(Continued)

OTHER PUBLICATIONS

PCT International Search Report and Written Opinion of the International Searching Authority mailed Oct. 5, 2022 corresponding to PCT Application No. PCT/US2021/052431 filed Sep. 28, 2021.

*Primary Examiner* — Tulsidas C Patel
*Assistant Examiner* — Mohammed Ahmed Qureshi

(57) ABSTRACT

An electric machine includes a stator having a stator bore and a stator winding. The stator winding is arranged to one of receive an electrical current and produce an electrical current having a power between 1 MW and 50 MW. The stator has a stator current density of greater than 5 A/mm$^2$. A rotor is at least partially disposed within the stator bore and has a rotor winding. The rotor has a rotor current density of greater than 5 A/mm$^2$. A high-pressure cooling system is operable to actively cool the stator and the rotor. The rotor winding and the stator winding interact to one of produce rotation of the rotor to drive a connected device in response to the receipt of the electrical current and produce the electrical current in response to rotation of the rotor driven by the connected device.

27 Claims, 18 Drawing Sheets

(56) References Cited

U.S. PATENT DOCUMENTS

| | | | |
|---|---|---|---|
| 3,648,085 | A | 3/1972 | Fujii |
| 4,647,805 | A | 3/1987 | Flygare et al. |
| 5,319,272 | A | 6/1994 | Raad |
| 6,078,115 | A | 6/2000 | Uchida et al. |
| 6,943,469 | B2 | 9/2005 | Nelson |
| 2004/0066099 | A1 | 4/2004 | Weeber et al. |
| 2011/0062492 | A1 | 3/2011 | Ko et al. |

FOREIGN PATENT DOCUMENTS

| | | | |
|---|---|---|---|
| EP | 0461905 | A2 | 12/1991 |
| GB | 851971 | A | 10/1960 |
| JP | S5793077 | U | 6/1982 |
| JP | H10146021 | A | 5/1998 |
| JP | 2004135499 | A | 4/2004 |
| JP | 2014135499 | A | 7/2014 |
| WO | 2015034514 | A1 | 3/2015 |

* cited by examiner

HIGH CURRENT DENSITY ELECTRIC MACHINE

BACKGROUND

Electric machines are used as generators, motors, or both depending on the application. Electric machines for large industrial and marine applications are often used as synchronous generators and/or motors such as ship propulsion drive motors. Thus, these electric machines operate at a number of different speeds and varying loads.

BRIEF SUMMARY

In one aspect, an electric machine includes a stator having a stator bore and a stator winding. The stator winding is arranged to one of receive an electrical current and produce an electrical current having a power between 1 MW and 50 MW. The stator has a stator current density of greater than 5 A/mm². A rotor is at least partially disposed within the stator bore and has a rotor winding. The rotor has a rotor current density of greater than 5 A/mm². A high-pressure cooling system is operable to actively cool the stator and the rotor. The rotor winding and the stator winding interact to one of produce rotation of the rotor to drive a connected device in response to the receipt of the electrical current and produce the electrical current in response to rotation of the rotor driven by the connected device.

In another construction, an electric machine includes a stator having a stator bore and a stator winding, a rotor at least partially disposed within the stator bore and having a rotor winding, and a first cooling circuit operable to cool the stator winding with a first flow of high-pressure fluid. A second cooling circuit is operable to cool the rotor winding with a second flow of high-pressure fluid, the first cooling circuit and the second cooling circuit defining a closed system.

In another construction, an electric machine includes a stator having a stator bore and a stator winding. A stator housing is arranged to enclose the stator and includes a first wall that supports a first bearing and a second wall that supports a second bearing. A rotor is at least partially disposed within the stator bore and has a rotor winding. The rotor is supported for rotation by the first bearing and the second bearing. An excitation system is coupled to the rotor and is disposed within the stator housing between the first bearing and the second bearing. The excitation system is operable to provide an excitation current to the rotor winding. A high-pressure cooling system is operable to provide a first flow of high-pressure fluid to cool one of the stator winding and the rotor winding.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
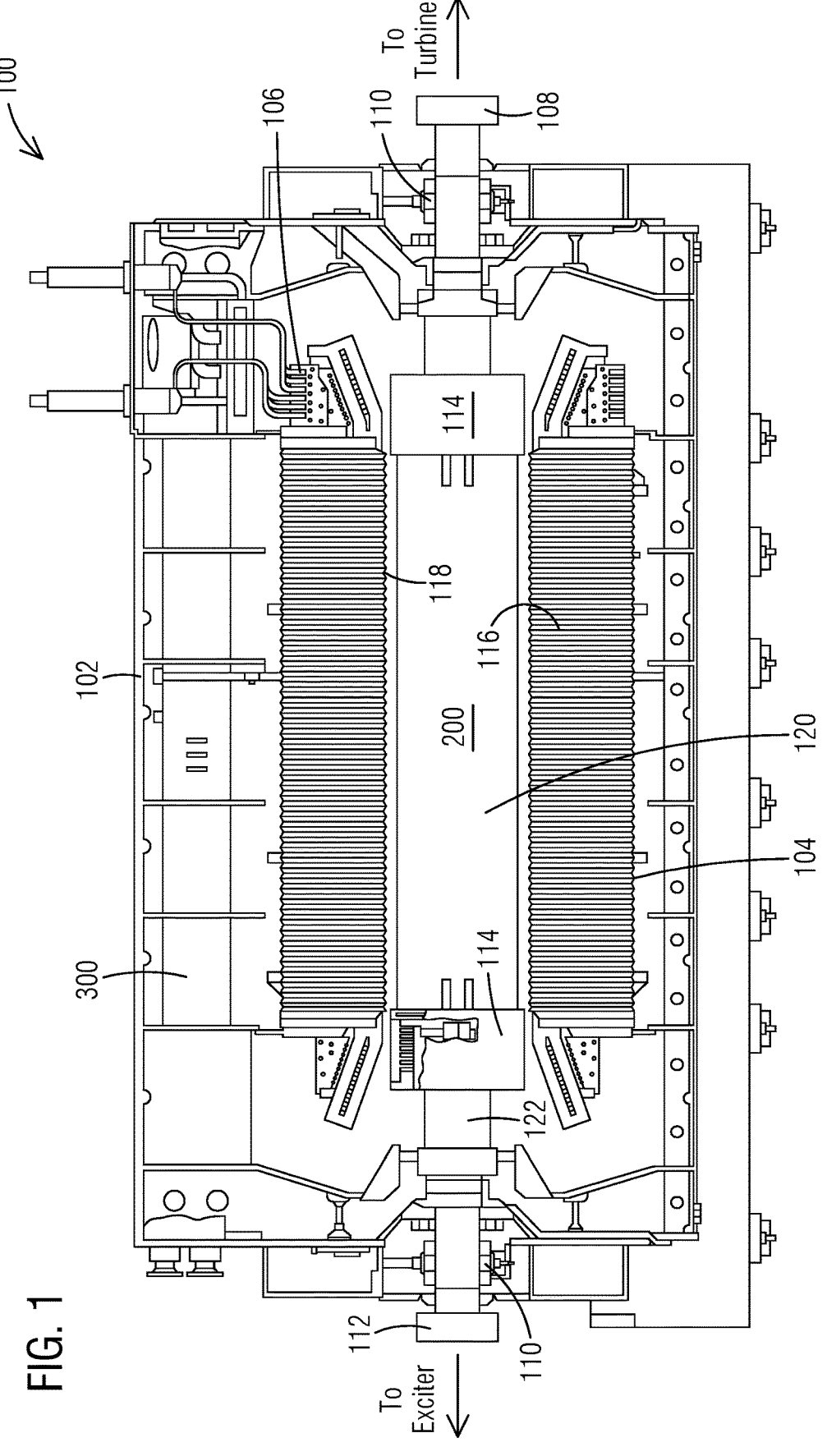
FIG. 1 is a cross-sectional view of a generator taken along the generator centerline, rotational, or longitudinal axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

As illustrated in FIG. 1, a generator 100 includes a stator 300 and a rotor 200 supported for rotation within the stator 300. The stator 300 includes a stator housing 102 that surrounds and substantially encloses a stator core 104. The stator core 104 is often made-up of a number of laminations 116 stacked in a longitudinal direction (along a rotational axis). Each lamination 116 includes cut outs or is otherwise shaped to define the desired features of the rotor body 120 including a bore 118 that is sized to receive the rotor 200.

In some constructions, a stator cooling system 106 is provided to cool the stator 300 and improve the efficiency and current density of the stator 300. In some constructions, a cooling gas is employed as a stator coolant. However, stators 300 may include liquid cooling such as water cooling if desired.

The rotor 200 includes a rotor body 120, a rotor shaft 122, and two retaining rings 114 coupled to the rotor shaft 122. In many instances, the rotor body 120 is considered to be part of the rotor shaft 122. The illustrated rotor shaft 122 is supported for rotation by a bearing 110 positioned at each end of the rotor 200. A turbine coupling 108 is positioned at one end of the rotor 200 to facilitate connection of the rotor 200 to a turbine (e.g., combustion turbine, steam turbine, hydro turbine, wind turbine, etc.) or to another prime mover when operated as a generator. The turbine coupling 108 may also connect to a power output device such as a propeller, compressor, gearbox, or the like when operated as a motor. The opposite end of the rotor 200 may include an excitation system coupling 112 that allows for connection to an excitation system or other rotating equipment.

The generator 100 illustrated in FIG. 1 is a synchronous generator 100. However, asynchronous generators or motors and the like could include the features described herein.

Figure 2:
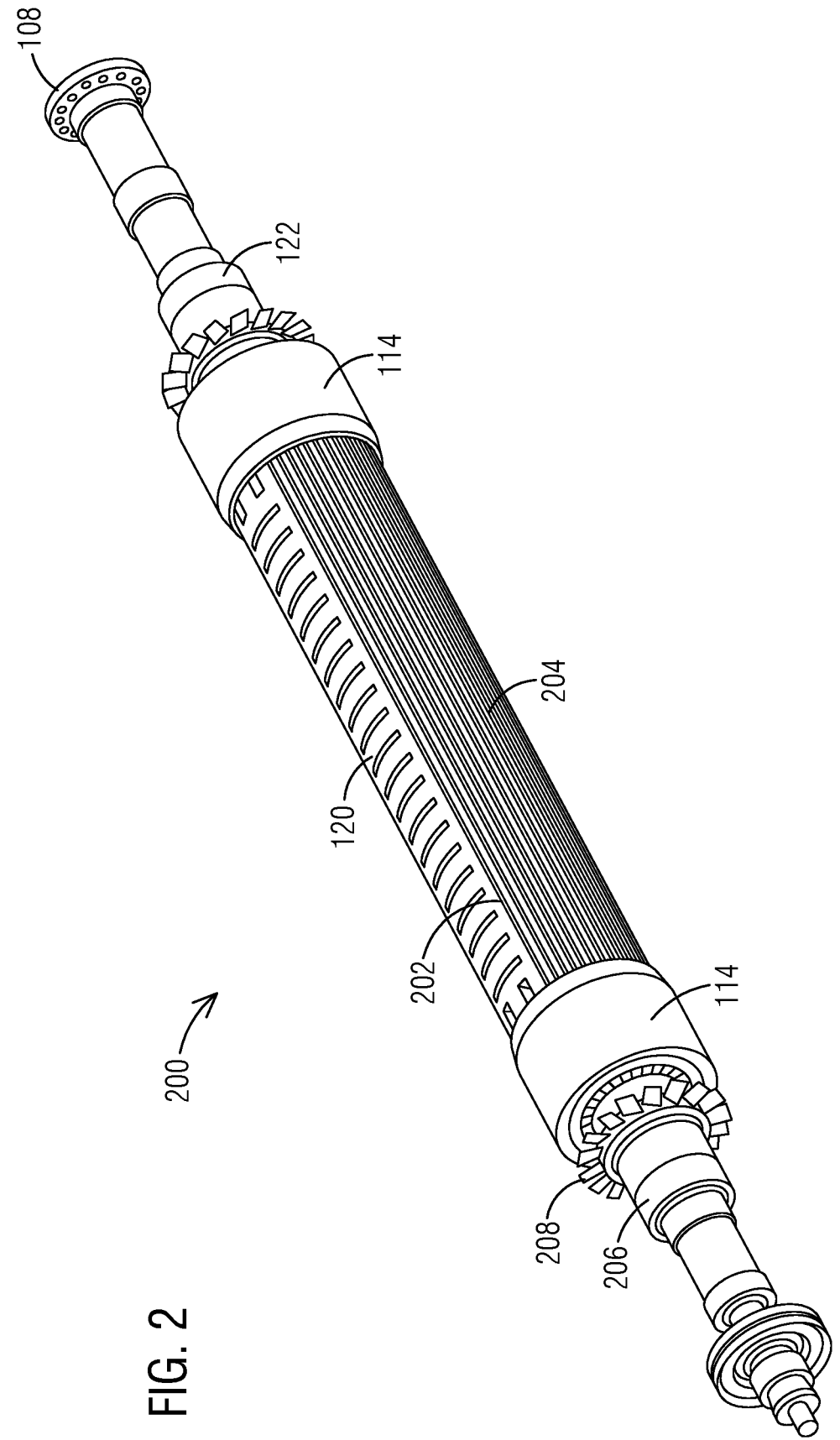
FIG. 2 is a perspective view of a rotor suitable for use in the generator of FIG. 1.

FIG. 2 illustrates the rotor 200 of FIG. 1 in greater detail. The rotor body 120 includes a series of rotor slots 202 that extend longitudinally along the rotor body 120. Rotor windings 204 are positioned within the rotor slots 202 to define one or more pairs of poles. In the illustrated construction, two poles are formed by the rotor windings 204. However, other constructions could include four poles, eight poles or more poles if desired. The rotor 200, sometimes referred to as a field, also includes a conductor 206 that connects to an excitation system which provides electrical current at a desired voltage to the rotor windings 204 to generate a magnetic field. Suitable excitation systems include but are not limited to exciters, collectors, and rotating transformers.

The rotor 200 may also include a rotor cooling system 208 that operates to cool the rotor 200. In some constructions, the rotor 200 is air-cooled with other constructions employing another fluid such as hydrogen.

Figure 3:
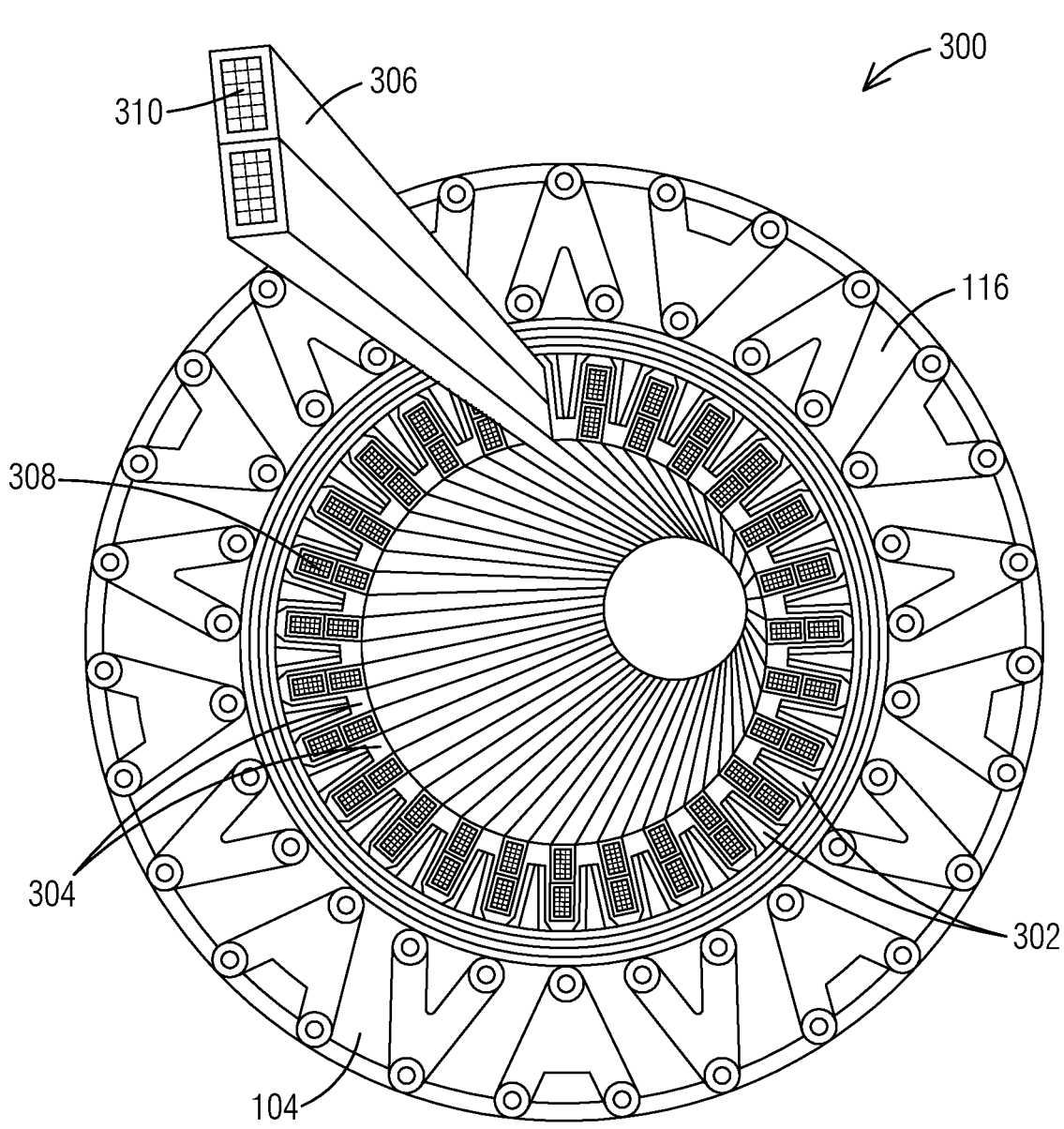
FIG. 3 is a perspective view of a portion of a stator suitable for use in the generator of FIG. 1.

Turning to FIG. 3, the stator core 104 is illustrated in greater detail. The stator core 104, in most constructions is formed from a series of laminations 116 that are stacked in the longitudinal direction. Each lamination 116 includes cut-outs, openings, or features that when stacked define the desired features of the stator core 104. Each of the laminations 116 includes a number of teeth 302 that are evenly spaced circumferentially around the bore 118. The teeth 302 cooperate to define a series of slots that extend the length of the stator core 104. Bars 306 are positioned within the slots and are electrically connected to one another to define a series of stator windings. In the illustrated generator 100, the stator windings are arranged to define three phases. Generally, the three phases are electrically arranged to define a delta-circuit, or a Y-circuit as may be desired. Of course, other constructions could include a single phase, or more than three phases (i.e., six phase) if desired.

As part of the stator cooling system 106, each of the bars 306 may include one or more coolant passages 310 that allow for the flow of coolant along the length of the bar 306. As discussed, a coolant fluid such as water is often employed to cool the stator 300.

Figure 4:
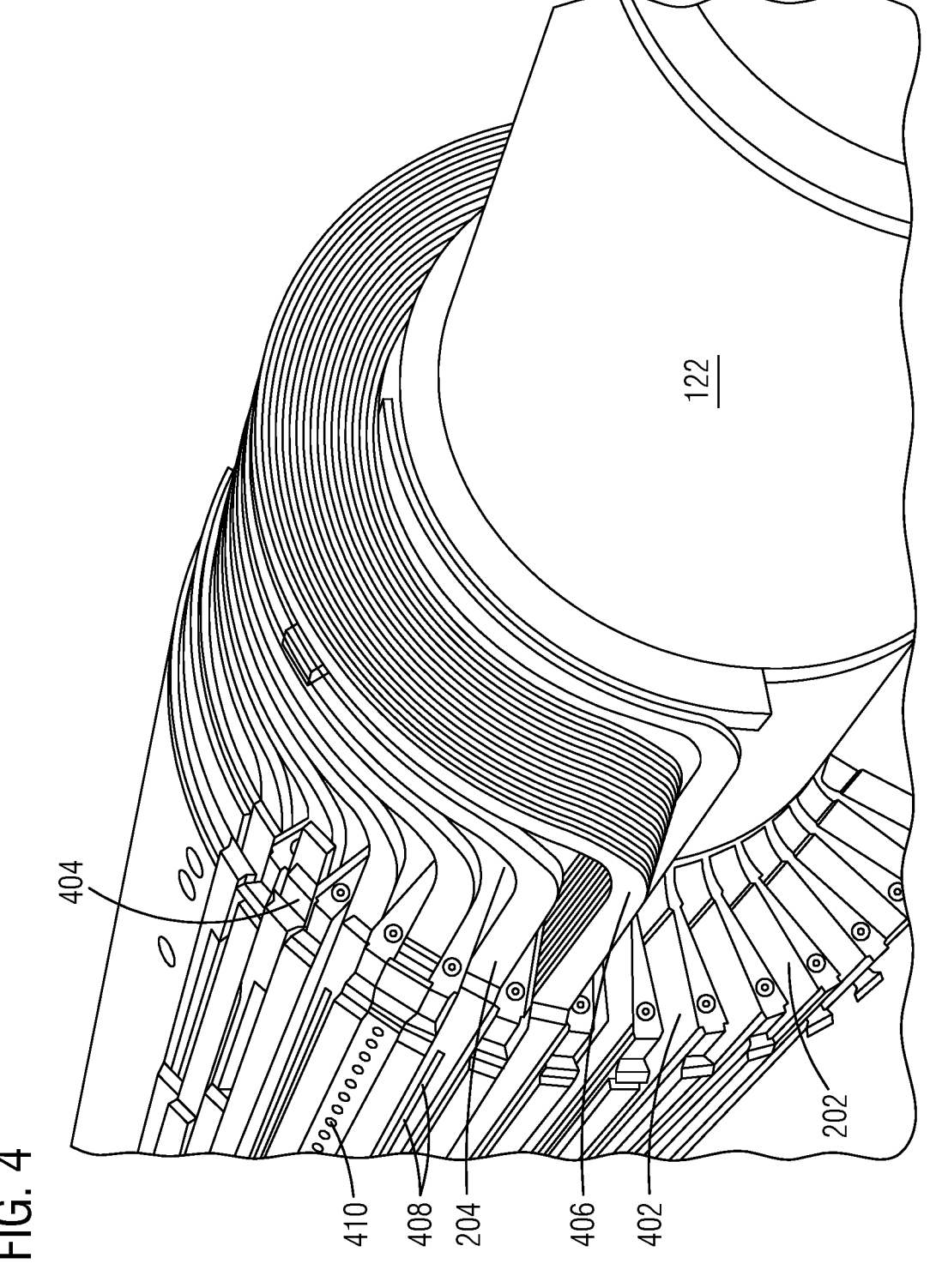
FIG. 4 is a perspective view of a rotor suitable for use in the generator of FIG. 1.

FIG. 4 better illustrates the rotor 200 of FIG. 2 with one of the retaining rings 114 removed. The rotor 200 is a two-pole rotor 200 with a single rotor winding 204 illustrated in place. The rotor 200 includes the rotor shaft 122 that supports a plurality of teeth 302 that extend radially outward around the circumference of the rotor shaft 122. In most constructions, the teeth 402 are machined from a solid shaft such that the teeth 402 and the rotor shaft 122 are a single inseparable component. Each tooth 402 cooperates with an adjacent tooth 402 to define one of the rotor slots 202 therebetween.

The teeth 402 each define an outer most surface that defines the largest diameter of the rotor shaft 122. A retaining ring fit 404 may be machined into the teeth 402 near their axial ends to provide a fit location for the retaining ring 114. Of course, other constructions may omit the retaining ring fit 404 if desired or may include a number of different arrangements of the retaining ring fit 404.

The rotor winding 204 is formed from a series of coils that define a continuous or complete loop. Thus, each coil extends along a first rotor slot 202 in a first axial direction, makes a loop at a first end to define an end turn 406, extends in a second axial direction in a second rotor slot 202 in a second direction opposite the first direction, and makes a second turn to complete the loop. A series of the coils are stacked and connected to one another to define the various rotor windings 204 that in turn cooperate to define the desired poles.

A layer of insulation 408 is positioned between adjacent coils in each of the rotor slots 202 to insulate them from one another to reduce the likelihood of undesirable connections between the coils. One or more wedges 410 are positioned at the outer diameter or the top of each rotor slot 202 to wedge the coils and insulation in place to reduce undesirable movement during operation. The retaining rings 114 are then coupled to the rotor shaft 122 with each retaining ring 114 engaging one of the retaining ring fits 404 to allow the retaining ring 114 to cover and protect the end turns 406 while also holding the end turns 406 in place.

Figure 5:
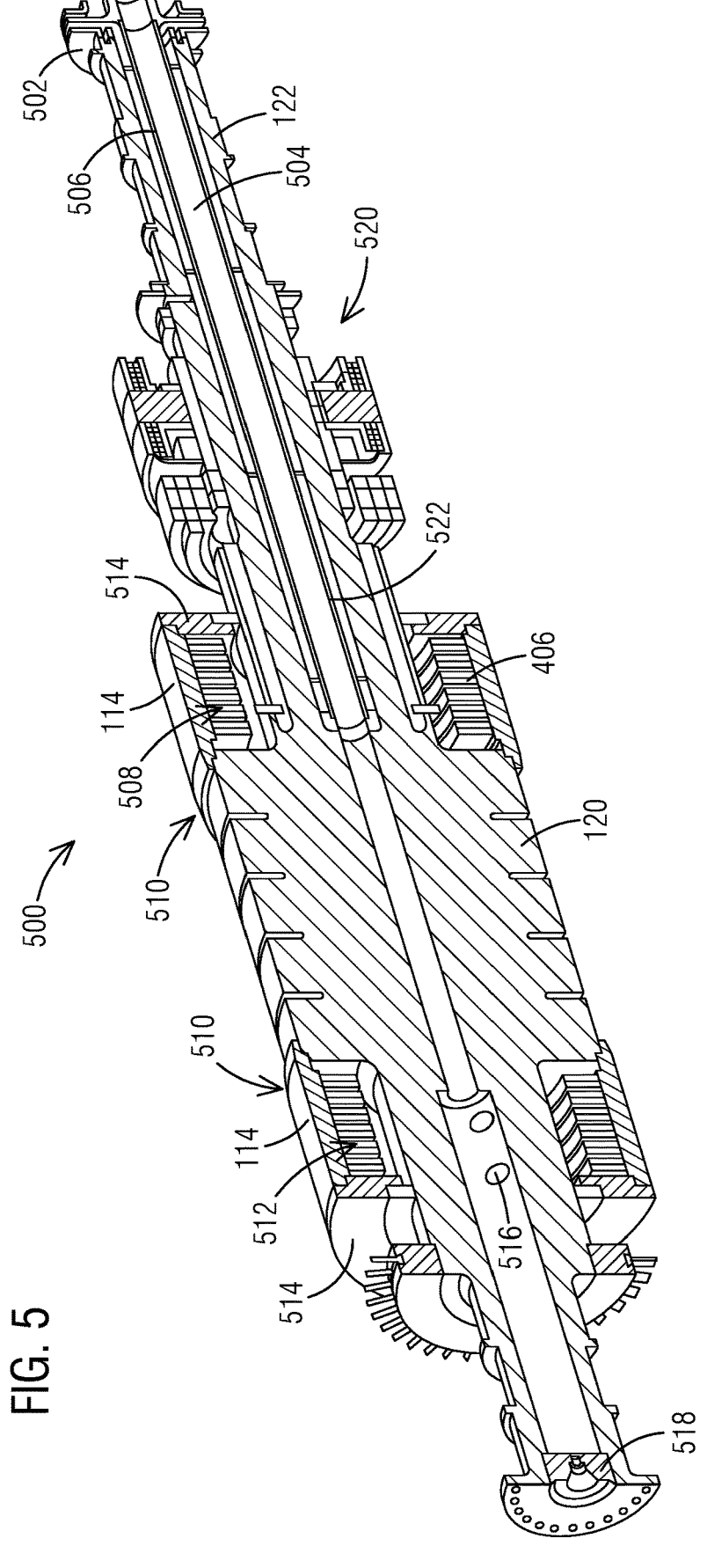
FIG. 5 is a perspective section view of a rotor including a pressurized rotor cooling system suitable for use in the generator of FIG. 1.

FIG. 5 illustrates a rotor 500 suitable for use in the generator 100 of FIG. 1. The rotor 500 includes a rotor cooling system 520 that allows for the circulation of a pressurized coolant, typically air through the rotor body 120 to cool the rotor body 120, and more specifically the rotor windings 204 and provide for more efficient operation at both a higher current density and higher power density than what could otherwise be achieved.

The rotor cooling system 520 is a closed system that may receive compressed air from a stationary compressor (not shown) such that the air (or other gas if employed) within the system is maintained at a desired high-pressure (i.e., greater than atmospheric pressure). The rotor cooling system 520 includes a coolant pump 502, an inlet bore 504, a discharge annulus 506, one or more inlet apertures 516, a first coolant space 512, and a second coolant space 508. The coolant pump 502 in the illustrated construction includes a centrifugal pump or other mechanism directly connected to the rotor shaft 122 for co-rotation therewith and capable of circulating the already pressurized air, or other gas through the rotor cooling system 520. Alternatively, an external pump or compressor can be integrated into the stationary portion of the rotor cooling system to circulate the coolant. The coolant pump 502 is arranged to exhaust warm air to be cooled in a heat exchanger (not shown) and then returned to the inlet bore 504 as part of the closed loop high-pressure rotor cooling system 520, with other arrangements being possible.

The inlet bore 504 extends the full length of the rotor 500 and includes a plug 518 positioned at one end to seal the inlet bore 504, thereby facilitating the containment of the high-pressure coolant therein. One or more inlet apertures 516 extend through the rotor shaft 122 to provide a fluid connection between the inlet bore 504 and the first coolant space 512. In the illustrated construction, multiple inlet apertures 516 extend radially through the rotor shaft 122. The number of inlet apertures 516 and the size of those inlet apertures 516 are selected to assure the desired flow rate between the inlet bore 504 and the first coolant space 512.

The first coolant space 512 contains one set of end turns 406 and is defined by the cooperation of the rotor shaft 122, the rotor body 120, one of the retaining rings 114, and an end plate 514. A first end of the retaining ring 114 cooperates with the rotor body 120 to define a first ring seal area 510. The second opposite end of the retaining ring 114 engages an outer diameter of the end plate 514. An inner diameter of the end plate 514 engages the rotor shaft 122 to seal the first coolant space 512. It should be noted that while the end plate 514 is described as a single component, multiple components or parts could cooperate to define the end plate 514.

The first coolant space 512 is fluidly connected to the rotor slots 202 to facilitate the flow of high-pressure coolant from the first coolant space 512 to the second coolant space 508. The second coolant space 508 contains the second set of end turns 406 opposite the first set of end turns 406. The second coolant space 508 is substantially the same as the first coolant space 512 and is defined by the cooperation of the rotor shaft 122, the rotor body 120, the other of the retaining rings 114, and another end plate 514. The second coolant space 508 collects the high-pressure coolant from the rotor slots 202 and directs that flow to the discharge annulus 506.

The discharge annulus 506 is formed by the cooperation of the rotor bore and an annular sleeve 522 positioned within the rotor bore and spaced apart from the outer wall of the rotor bore. Thus, the annular sleeve 522 divides the rotor bore into the inlet bore 504 inside of the rotor annular sleeve 522, and the discharge annulus 506 formed by the cooperation of the rotor bore and the annular sleeve 522.

Figure 6:
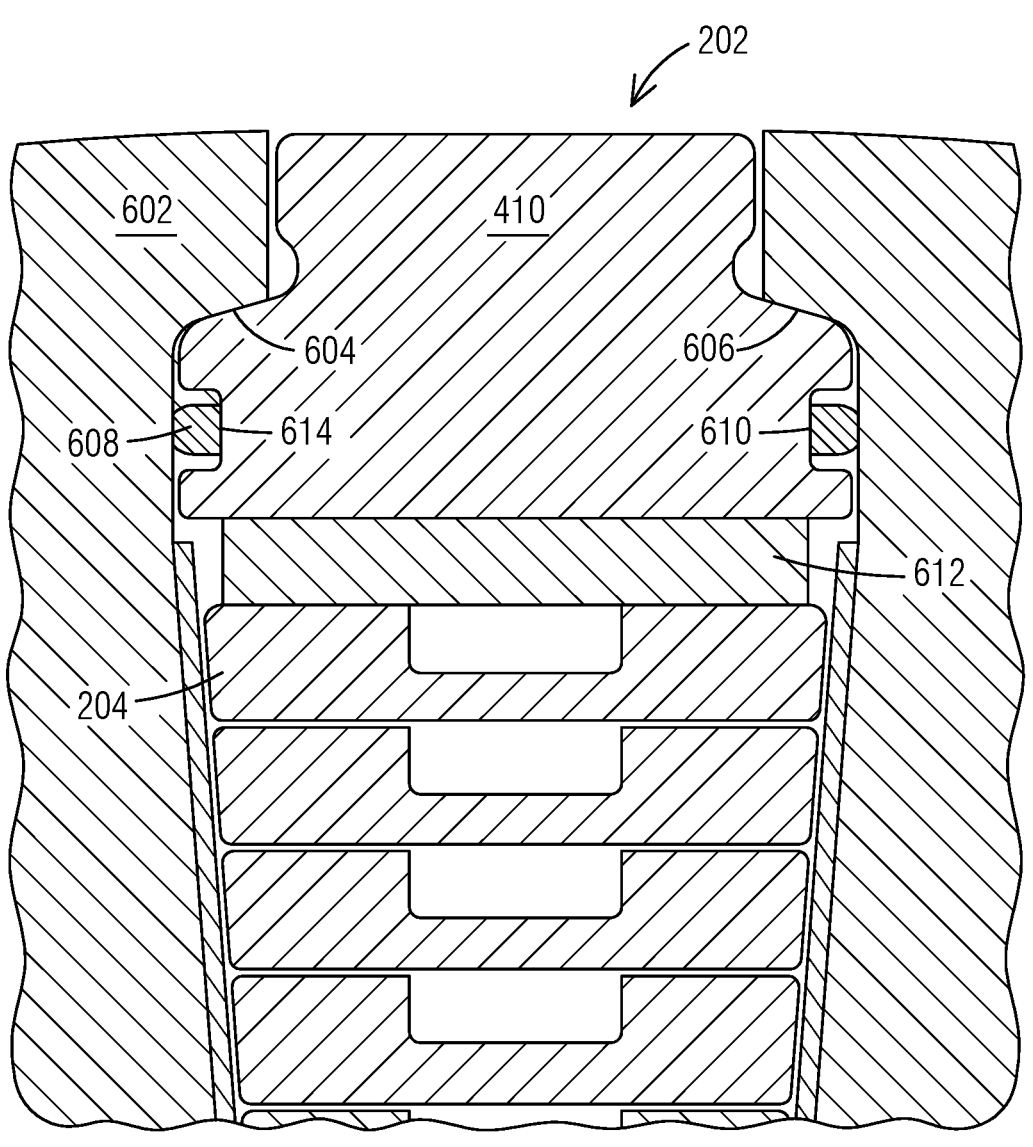
FIG. 6 is an axial end view of a portion of a rotor slot of the rotor of FIG. 5.

FIG. 6 illustrates the top or outside diameter portion of one of the rotor slots 202 better showing the placement of the wedge 410. In the illustrated construction, each tooth 602 defines a tooth hook 604 that extends at an oblique angle with respect to a radial axis of the rotor 200.

Each of the wedges 410 includes two wedge hooks 606 and two seal slots 610. Each wedge hook 606 includes an oblique surface arranged to engage one of the tooth hooks 604. Each of the seal slots 610 includes a rectangular cross-section groove that extends along the wedge 410 in a direction that is substantially parallel to the longitudinal axis of the rotor 200. While the illustrated construction includes a rectangular seal slot 610, other shapes could be employed if desired. The seal slots 610 can be part of the wedge extrusion or can be machined into the wedge 410 after it is extruded, as may be desired.

A seal member 608 (or seal component) is positioned within the seal slots 610 and is sized to form a fluid-tight seal between the teeth 602 that define the rotor slot 202 and the wedge 410 positioned within the rotor slot 202. In the illustrated construction, the seal member 608 has a D-shaped cross-section. Of course, other shapes (e.g., O-shaped cross-section) or other seal members could be employed if desired.

In the illustrated construction, the wedge 410 and the seal members 608 extend the full length of the rotor slot 202 to reduce the likelihood of a leak. In addition, in the illustrated construction, each side of the wedge 410 supports a separate seal member 608. However, other constructions could employ a seal member 608 in the form of a continuous loop if desired.

One seal member 608 suitable for use in the construction of FIG. 6 includes a resilient material formed in a "D" shape (i.e., a D-shaped cross section) but being a single component with two separate ends rather than formed in a loop. In addition, some constructions include an adhesive portion 614 or material on the flat side of the D-shaped cross section. The adhesive portion 614 attaches the seal member 608 to the wedge 410 to reduce the likelihood of relative movement or unwanted stretching of the seal member 608 during installation of the wedge 410. Two separate seal members 608 are used with one positioned on either side of the wedge 410. Suitable resilient materials include rubber, synthetic rubber, or other compliant materials.

Figure 7:
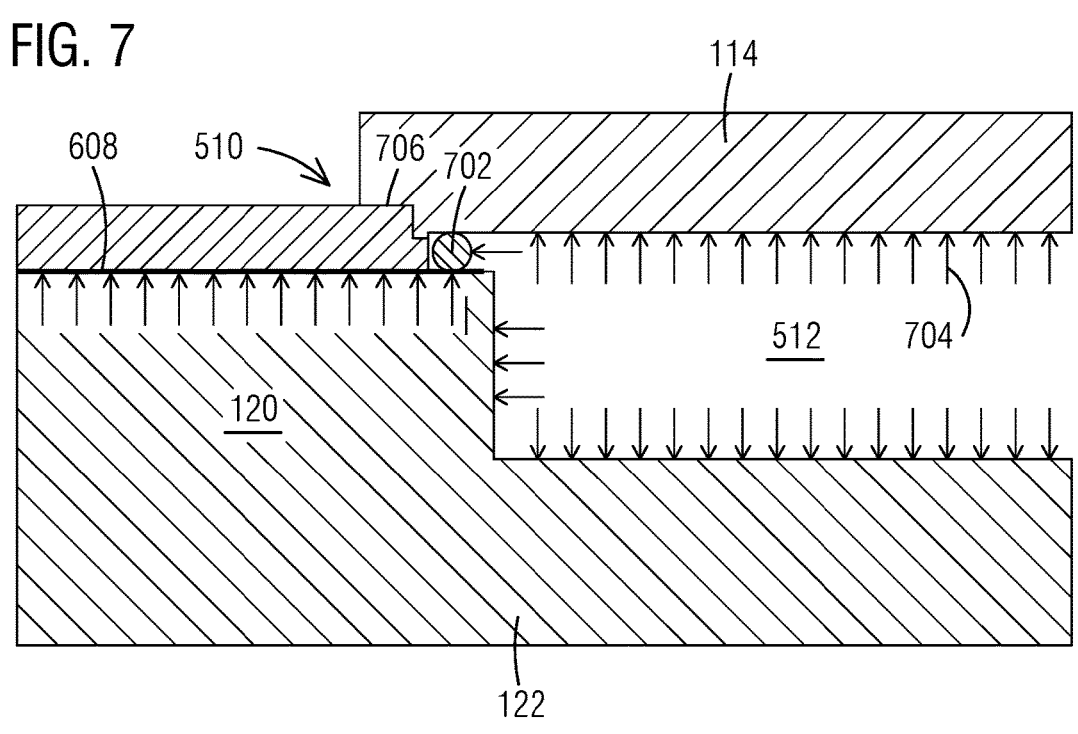
FIG. 7 is a schematic section view of a portion of the slot of FIG. 6 and the rotor of FIG. 5.

FIG. 7 illustrates in greater detail a ring seal area 510 positioned adjacent the first coolant space 512. However, it should be understood that the illustrated ring seal area 510 could also be positioned adjacent the second coolant space 508.

The ring seal area 510 includes two separate seals formed between the retaining ring 114 and the rotor body 120. A shrink-fit seal 706 is formed between the retaining ring 114 and the rotor body 120 when the retaining ring is positioned in its operating position with a proper shrink-fit. A ring seal 702 is positioned between the retaining ring 114 and the rotor body 120 to form another circumferential seal. The ring seal 702 defines an inner diameter that coincides with the position of the seal member 608 such that the ring seal 702 also cooperates with the seal member 608 to complete the sealing of the first coolant space 512. Pressure 704, applied by the high-pressure coolant is fully contained with the only path from the first coolant space 512 being through the rotor slots 202 and rotor windings 204 contained therein. In the illustrated construction, the ring seal 702 is a continuous circular seal member having an O-shaped cross section. Of course, other shapes (e.g., D-shaped cross-section) or arrangements could be employed. While typical ring seals 702 are formed from resilient material (e.g., rubber), other constructions could employ more rigid materials, composite seals, spring-based seals, and the like. As such, the ring seal 702 should not be limited to the arrangement illustrated in FIG. 7.

Figure 8:
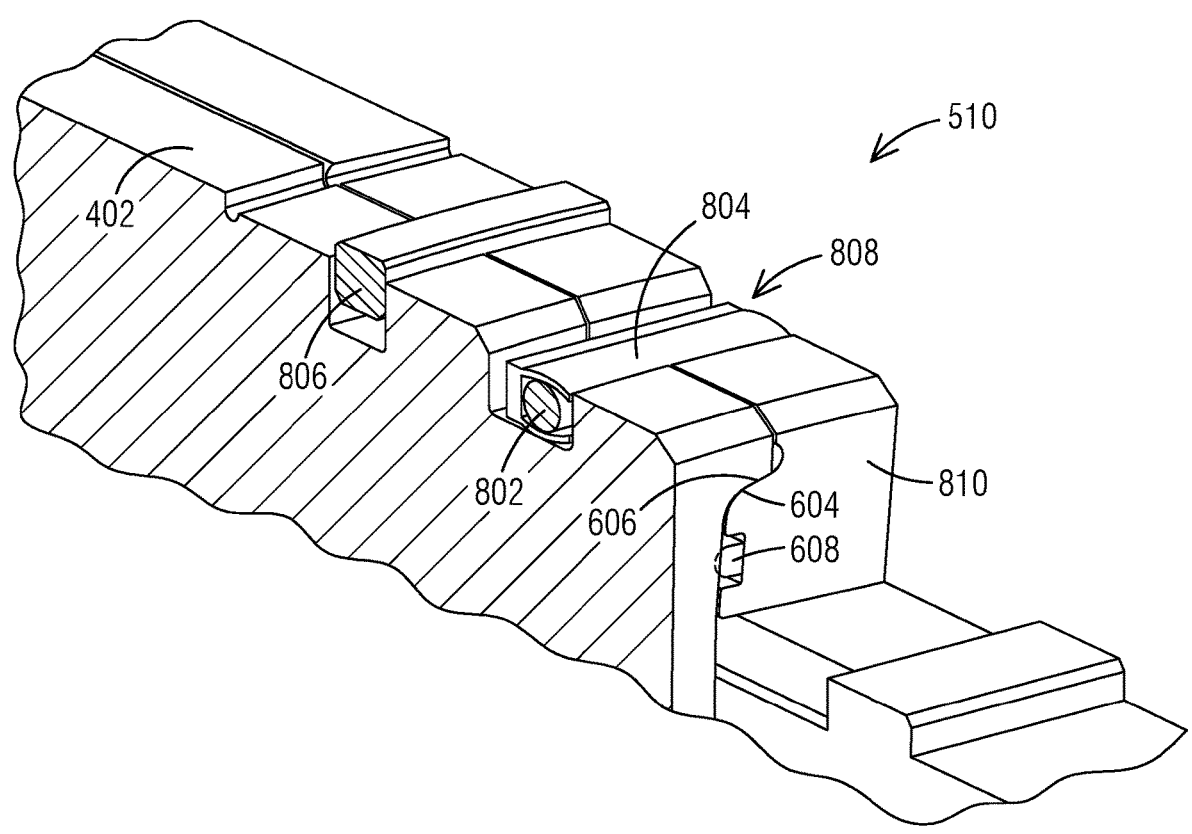
FIG. 8 is a perspective partially broken away view of a portion of an axial end of a slot of the rotor of FIG. 5 illustrating a first ring seal area.

FIG. 8 illustrates another arrangement of the ring seal area 510 suitable for use with either or both retaining rings 114 (not shown in FIG. 8). The arrangement of FIG. 8 at least partially forms a seal between the retaining ring 114 and the rotor body 120, and more specifically, the rotor teeth 402 and the wedge 810 with the same shrink-fit discussed with regard to FIG. 7.

The construction of FIG. 8 includes a ring seal 808 that is a composite of a resilient member 802 and a sleeve 804. The resilient member 802 could include a solid, continuous member having an O-shaped cross-section or could be formed from other more rigid materials or composites as described with regard to the ring seal 702 of FIG. 7. In another construction, the resilient member 802 includes a spring-energized seal formed from a coiled material much like a coiled spring (e.g., slanted coil spring, helical spring, etc.). Thus, in this construction, the resilient member 802 has an annular cross section.

The sleeve 804 is formed to have a U-shaped cross-section that defines a receiving space in which the resilient member 802 is positioned. The sleeve 804 covers and protects the resilient member 802 during operation and directly contacts the rotor body 120, the wedge 810, and the retaining ring 114 when the retaining ring 114 is in its operating position. It should also be noted that the open end of the U-shaped cross-section is arranged to face the direction where the high-pressure fluid is disposed (i.e., toward the first coolant space 512 and the second coolant space 508). In this arrangement, should the sleeve 804 be exposed to high-pressure fluid, it would tend to expand the U-shaped cross-section, thereby enhancing the sealing effect of the ring seal 808.

Unlike the construction of FIG. 7, the ring seal 808 includes an inside diameter portion that is disposed radially outward of the seal member 608. Rather than cooperating with the seal member 608 to form the seal, the ring seal 808 is positioned to pass through the intersection of the tooth hook 604 and the wedge hook 606. In this position the same effective seal is formed. Of course, the ring seal 808 could be positioned radially inward of the illustrated position such that it contacts the seal member 608 and forms a seal much like that described with regard to FIG. 7 if desired.

A retaining ring key 806 is positioned within a slot formed in the rotor body 120 and wedge 810 and cooperates with the retaining ring 114 to maintain the retaining ring 114 in its desired operating position.

Figure 9:
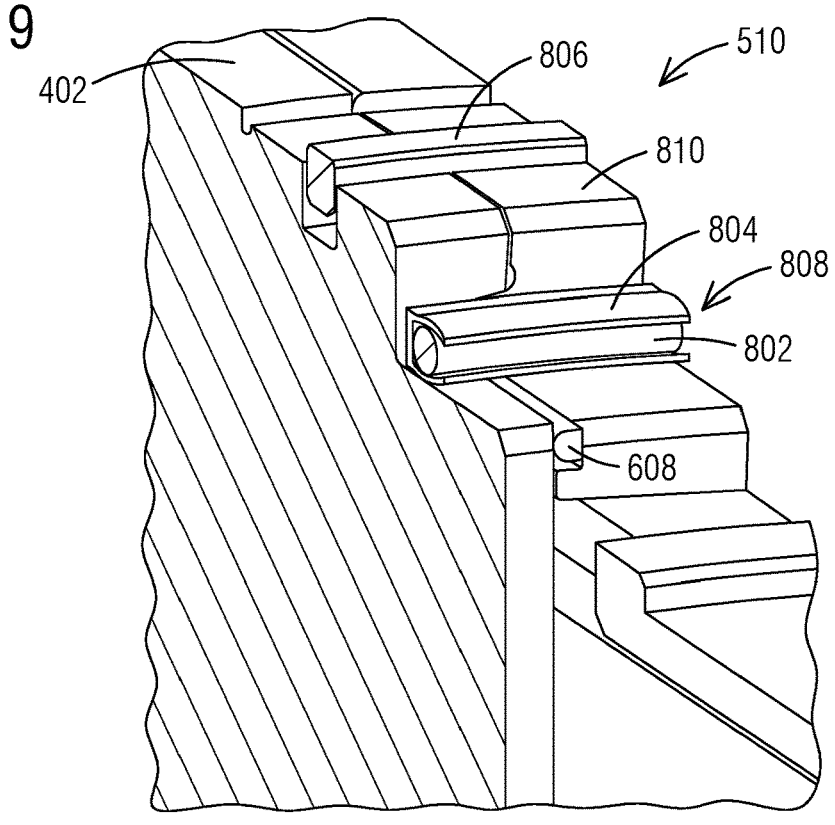
FIG. 9 is a perspective partially broken away view of a portion of another axial end of a slot of the rotor of FIG. 5 illustrating another first ring seal area.

FIG. 9 illustrates a construction that is similar to that of FIG. 8 with the exception of the positioning of the ring seal 808. In the construction of FIG. 9, the inner diameter of the ring seal 808 coincides with the seal member 608 such that the ring seal 808 and the seal member 608 cooperate to define at least a portion of the seal between the retaining ring 114, the rotor body 120, and the wedge 810.

Figure 10:
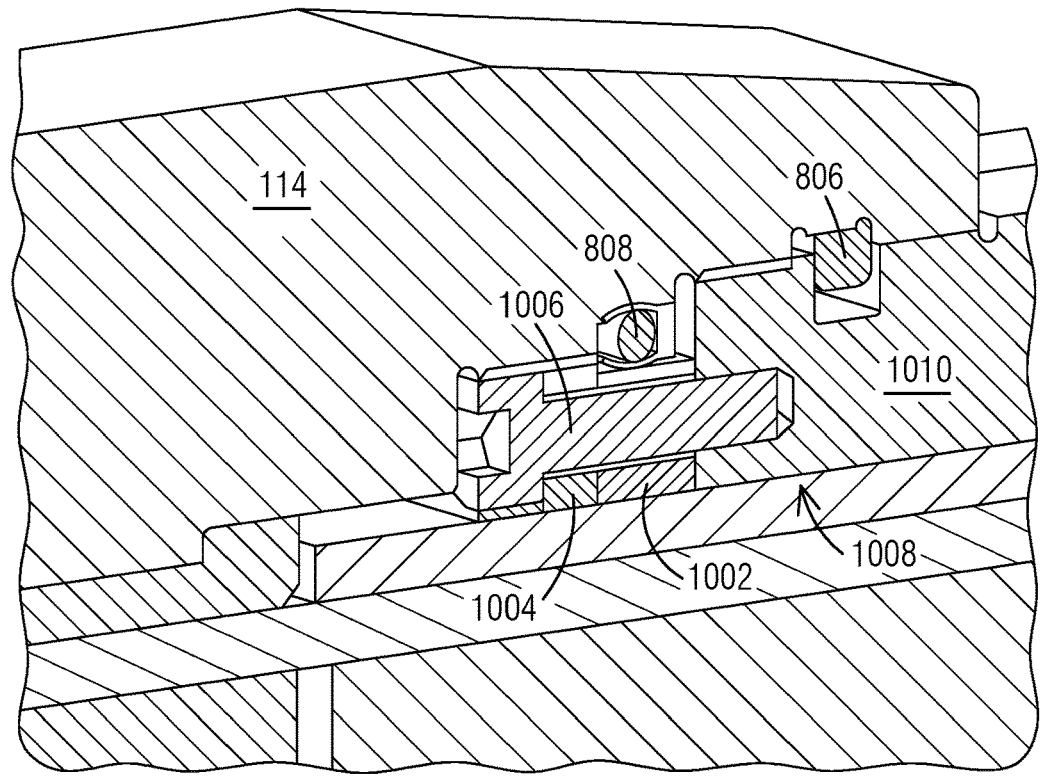
FIG. 10 is a perspective partially broken away view of a portion of another axial end of a slot of the rotor of FIG. 5 illustrating another first ring seal area.

FIG. 10 illustrates another construction of a wedge 1008 suitable for use in place of, or in conjunction with the wedge 410, 810. The wedge 1008 includes a wedge body 1010, a wedge insert 1002, a wedge cap 1004, and one or more wedge bolts 1006. The wedge body 1010 is similar to the wedge 810 but is shorter such that the remaining components, positioned at either end complete the wedge 1008 and the wedge 1008 is the same length as the wedge 810. While FIG. 10 illustrates one end of the wedge 1008, it should be understood that the same or a similar arrangement can be formed at either end. As such, only one end will be described in detail.

The wedge insert 1002 is positioned to abut the end of the wedge body 1010 and may have a cross-sectional shape that is the same as or similar to the cross-sectional shape of the wedge body 1010. The wedge insert 1002 is formed from a resilient material that expands radially and circumferentially in response to an axial compression. The material used is selected to provide the desired expansion as will be discussed in greater detail. The wedge cap 1004 forms a seal due to Poisson's effect. However, another type of wedge insert works due based on geometric interference. In this arrangement, the wedge insert has a tapered form with a thin outer wall, which allows it to be pressed in axially. The thin outer wall will deflect and provide sufficient contact pressure to seal if a sufficiently compliant material is utilized.

The wedge cap 1004 is positioned to abut the wedge insert 1002 such that the wedge insert 1002 is sandwiched between the wedge cap 1004 and the wedge body 1010. The wedge cap 1004 has the same or a similar cross-sectional shape as the wedge body 1010 and is generally formed from a similar material. The wedge bolts 1006 pass through the wedge cap 1004 and the wedge insert 1002 and threadably engage the wedge body 1010. As the wedge bolts 1006 are tightened, the wedge insert 1002 is compressed and expands or bulges in the radial and circumferential directions. This expansion enhances the contact between the wedge insert 1002 and any adjacent components to form a more effective seal therebetween.

The remaining construction of the ring seal area 510 of FIG. 10 is similar to that of FIG. 8. The ring seal 808 is positioned with an inside diameter abutting or near an outside diameter of the wedge insert 1002. The construction of the ring seal 808 is otherwise the same as that described with regard to FIG. 8 and FIG. 9. The retaining ring key 806 is also formed and positioned in a manner similar to that described with regard to FIG. 8 and FIG. 9.

The wedge 1008 includes two seal members 608 as described above. The seal members 608 can engage each of the wedge body 1010, the wedge inserts 1002, and the wedge caps 1004 in much the same manner as described above. In addition, the ring seal 808 is positioned at a diameter outside of the seal members 608 as was described with regard to the construction of FIG. 8.

It should be noted that the features described above could be combined with one another to define different arrangements of the ring seal area 510. Thus, the arrangement should not be limited to the few examples provided herein.

Figure 11:
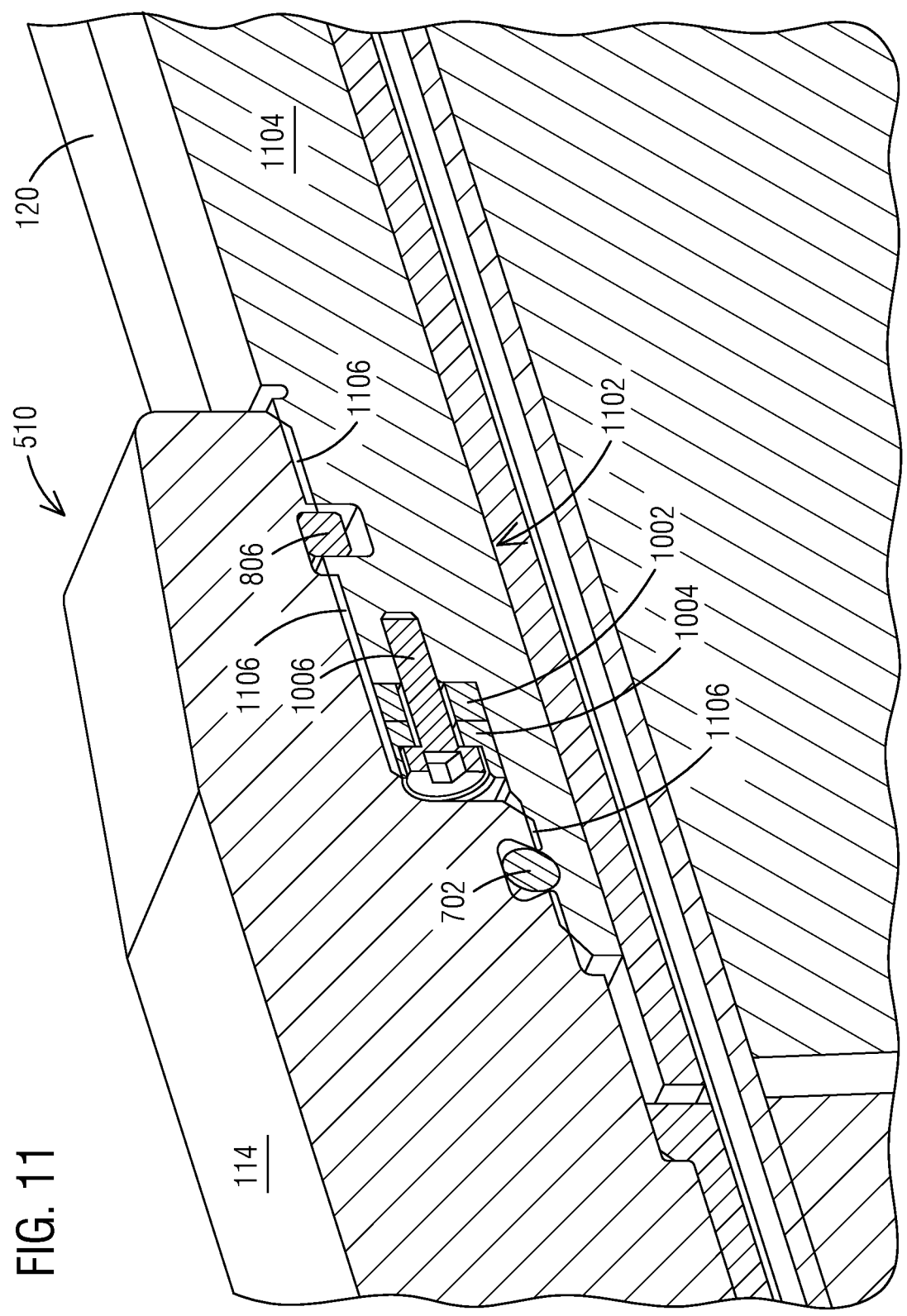
FIG. 11 is a perspective partially broken away view of a portion of another axial end of a slot of the rotor of FIG. 5 illustrating another first ring seal area.

FIG. 11 illustrates an example of a combination of different elements described above that cooperate to define the ring seal area 510. In the illustrated construction, a wedge 1102 includes a wedge body 1104, a wedge insert 1002, a wedge cap 1004, and one or more wedge bolts 1006. The wedge body 1104 includes a removed section that receives the wedge insert 1002 such that an inner diameter of the wedge insert 1002 is positioned adjacent to or in contact with the wedge body 1104. In addition, a planar face of the wedge insert 1002 abuts a planar face of the wedge body 1104. The wedge cap 1004 is positioned in a manner similar to that described for the wedge insert 1002 except that the wedge cap 1004 abuts the wedge insert 1002. Thus, the wedge insert 1002 is sandwiched between the wedge cap 1004 and the wedge body 1104. As discussed with regard to the construction of FIG. 10, the wedge insert 1002 and the wedge cap 1004 may have the same or similar cross-sectional shapes as the wedge body 1104. The wedge bolts 1006 pass through the wedge cap 1004 and the wedge insert 1002 and threadably engage the wedge body 1104 to compress the wedge insert 1002 to cause the desired radial and circumferential expansion. In this construction, the wedge insert 1002 directly contacts the retaining ring 114 and the wedge body 1104 to form a first seal.

A ring seal 702 is positioned between the wedge body 1104 and the retaining ring 114 at an axial position away from the rotor body 120. The illustrated ring seal 702 is similar to the ring seal 702 described with regard to FIG. 7 and will not be described in detail. Of course, the ring seal 702 could be replaced with a ring seal similar to or identical to the ring seal 808 described with regard to FIG. 8 if desired.

Similar to the arrangements of FIG. 7 through FIG. 10, the retaining ring key 806 is positioned at an end near the rotor body 120 and operates much like the retaining ring keys previously described. Finally, the arrangement of FIG. 11 includes three distinct shrink-fit locations 1106 that operate to further enhance the seal in the ring seal area 510.

Figure 12:
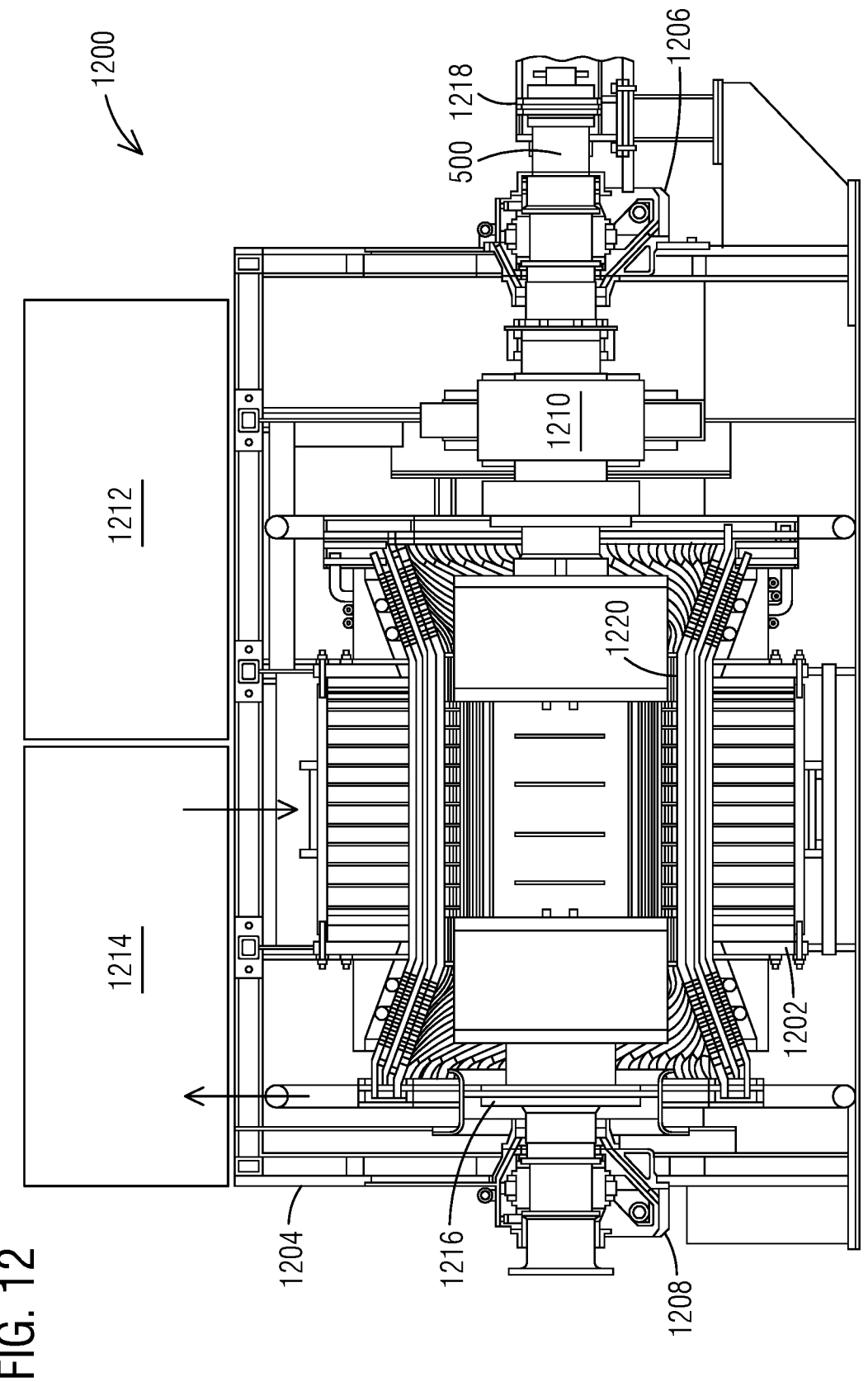
FIG. 12 is a cross-sectional view of an electric machine that is operable as a generator, a motor, or both.

FIG. 12 illustrates an electric machine 1200 that includes a stator 1202, a rotor 500, and a stator housing 1204 arranged to surround and enclose the stator 1202 and at least a portion of the rotor 500. The electric machine 1200 illustrated in FIG. 12 could include a generator, a motor, or a machine that is operable as either a generator or a motor. In addition, the electric machine 1200 can be synchronous or asynchronous and may operate at high speed (e.g., 10000 RPM), at low speeds (e.g., 100 RPM), and at any speed therebetween. Thus, the terms electric machine, generator, and motor are all applicable to the components illustrated herein.

The rotor 500 may be one of the rotors described with regard to FIG. 1-FIG. 11 or may include variations of those rotors. The stator 1202 defines a stator bore 1220 that receives the rotor 500. During operation, the electric machine 1200 can produce electricity (i.e., operate as a generator) or can use electricity (i.e., operate as a motor). Some electric machines 1200 can operate as either a generator or a motor as may be required for the particular mode of operation.

The stator housing 1204 includes a first wall that supports a first bearing 1206 and a second wall opposite the first wall that supports a second bearing 1208. In the illustrated construction, the stator housing 1204 includes two side walls that extend between the first wall and the second wall and a top that covers the space defined by the side walls, the first wall, and the second wall. The first bearing 1206 and the second bearing 1208 cooperate to fully support the rotor 500 for rotation.

An excitation system 1210, such as an exciter or alternative excitation system, may be positioned between the first bearing 1206 and the second bearing 1208 such that the excitation system 1210 is positioned within the stator housing 1204. Positioning the excitation system 1210 within the stator housing 1204 and between the bearings allows for a slightly shorter rotor 500 but also provides additional protection for the excitation system 1210 as well as the ability to cool the excitation system 1210 with the stator 1202 as will be discussed in greater detail.

A first heat exchanger 1212 and a second heat exchanger 1214 are positioned on top of the stator housing 1204 and are part of a cooling system for the electric machine 1200. Any number of heat exchanger arrangements are suitable for use as the first heat exchanger 1212 and/or the second heat exchanger 1214. For example, a closed air circuit air-cooled (CACA) arrangement could be employed as well as a closed air circuit water-cooled (CACW) for either or both of the first heat exchanger 1212 and/or the second heat exchanger 1214. A cooling air into water into air (CAWA) arrangement could also be employed if desired. It should be noted that the description of the heat exchanger arrangements refer to air as the cooling fluid. However, other gases (e.g., hydrogen, refrigerant, etc.) could be employed if desired. Additionally, for those that describe water as a coolant in the heat exchanger, other fluids or other sources of cooling could be employed if desired.

Figure 13:
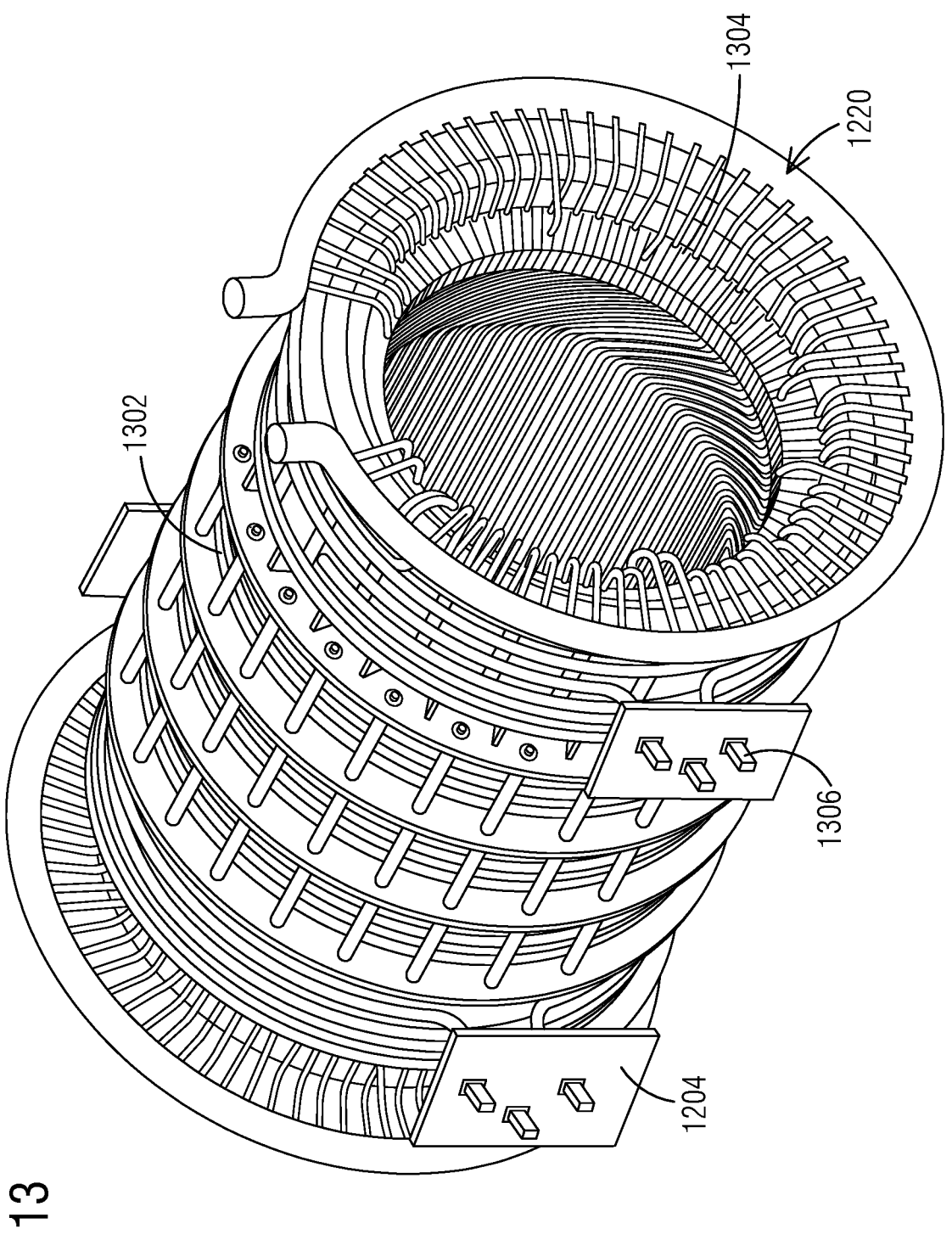
FIG. 13 is a perspective view of a stator core including a stator winding.

FIG. 13 illustrates a portion of the stator 1202 including a stator core 1302 and a stator winding 1304. The stator core 1302 may include a plurality of laminations stacked in a stackwise direction to form a magnetic core. A series of structural members such as tension rods or bolts hold the laminations in the desired positions. Each of the laminations has a cross-sectional shape that defines the stator bore 1220 and any stator slots 1402 (illustrated in FIG. 14). In some constructions, the laminations or the stator core 1302 itself define cooling gaps that allow for the flow of coolant through the stator core 1302 in a direction substantially normal to a central axis of the stator bore 1220. Of course, other constructions may provide flow paths that allow the coolant to run parallel to bore, or in any other desired direction.

The stator winding 1304 includes a plurality of stator coils 1404 (shown in FIG. 14) arranged in the various stator slots 1402 and electrically connected to define a continuous stator winding 1304. The stator winding 1304 can be arranged in a Y-circuit or a delta-circuit for a three-phase electric machine 1200 or any other desired arrangement (e.g., single phase machines). One or more main leads 1306 extend through the stator housing 1204 to allow for an external electrical connection to the stator winding 1304.

Figure 14:
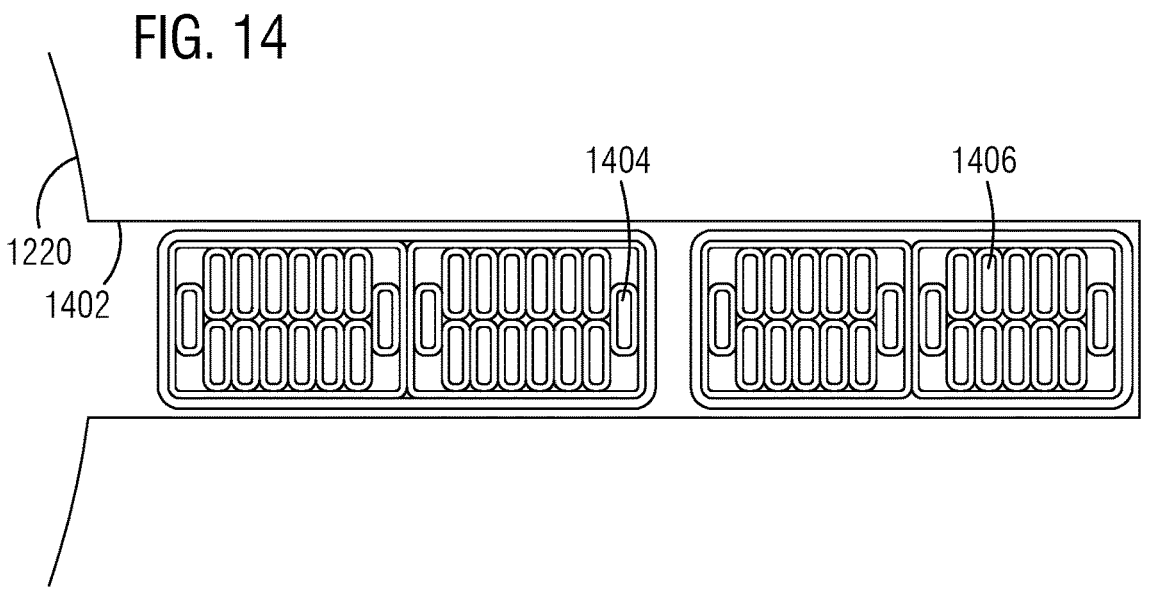
FIG. 14 is a section view of a stator slot of the stator core of FIG. 13 including a portion of the stator winding.

Turning to FIG. 14, one of the stator slots 1402 is shown to better illustrate the stator coils 1404 disposed therein. The stator coils 1404 can be arranged in any pattern desired, including the arrangement illustrated in FIG. 14. Each of the stator coils 1404 is substantially rectangular in cross-section and defines a coil channel 1406 therein. The coil channel 1406 allows for the flow of a coolant to directly cool the stator coils 1404 as will be discussed in greater detail. While the illustrated construction includes stator coils 1404 with substantially rectangular cross sections and substantially rectangular coil channels 1406, other shapes or arrangements could be employed if desired.

Figure 15:
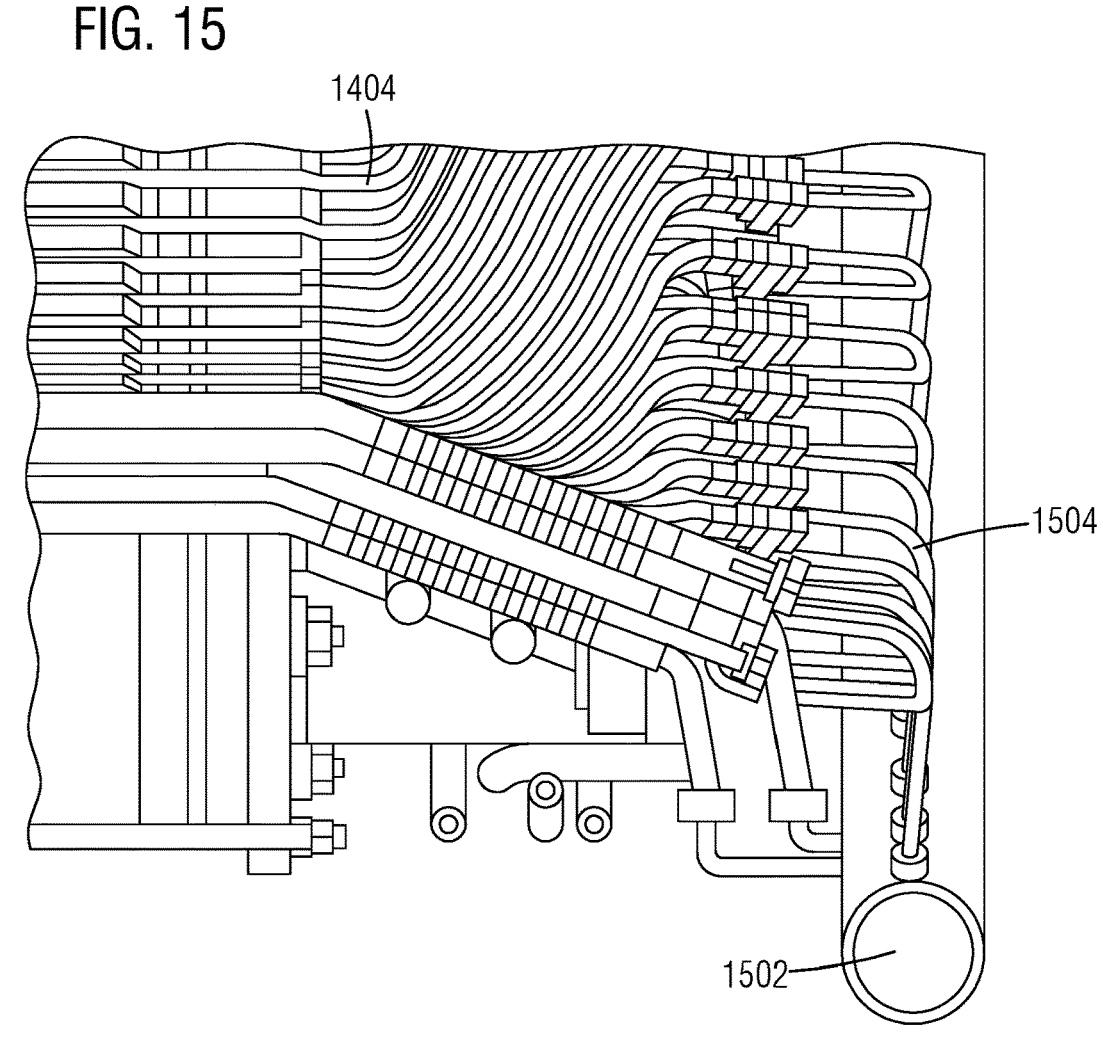
FIG. 15 is an enlarged perspective view of a portion of the stator core of FIG. 13 illustrating the connection of a stator coolant circuit.

In order to direct coolant into the coil channels 1406, the stator 1202 includes an inlet manifold 1502 and a plurality of coolant tubes 1504 at one end of the stator 1202. As illustrated in FIG. 15, the inlet manifold 1502 distributes cold coolant to each of the coolant tubes 1504 that in turn direct the coolant to the various stator coils 1404. The coolant flows through the coil channels 1406 to the opposite side of the stator 1202 where a second set of coolant tubes 1504 collect the coolant and direct it to an outlet manifold 1602 (shown in FIG. 16) for collection.

Figure 16:
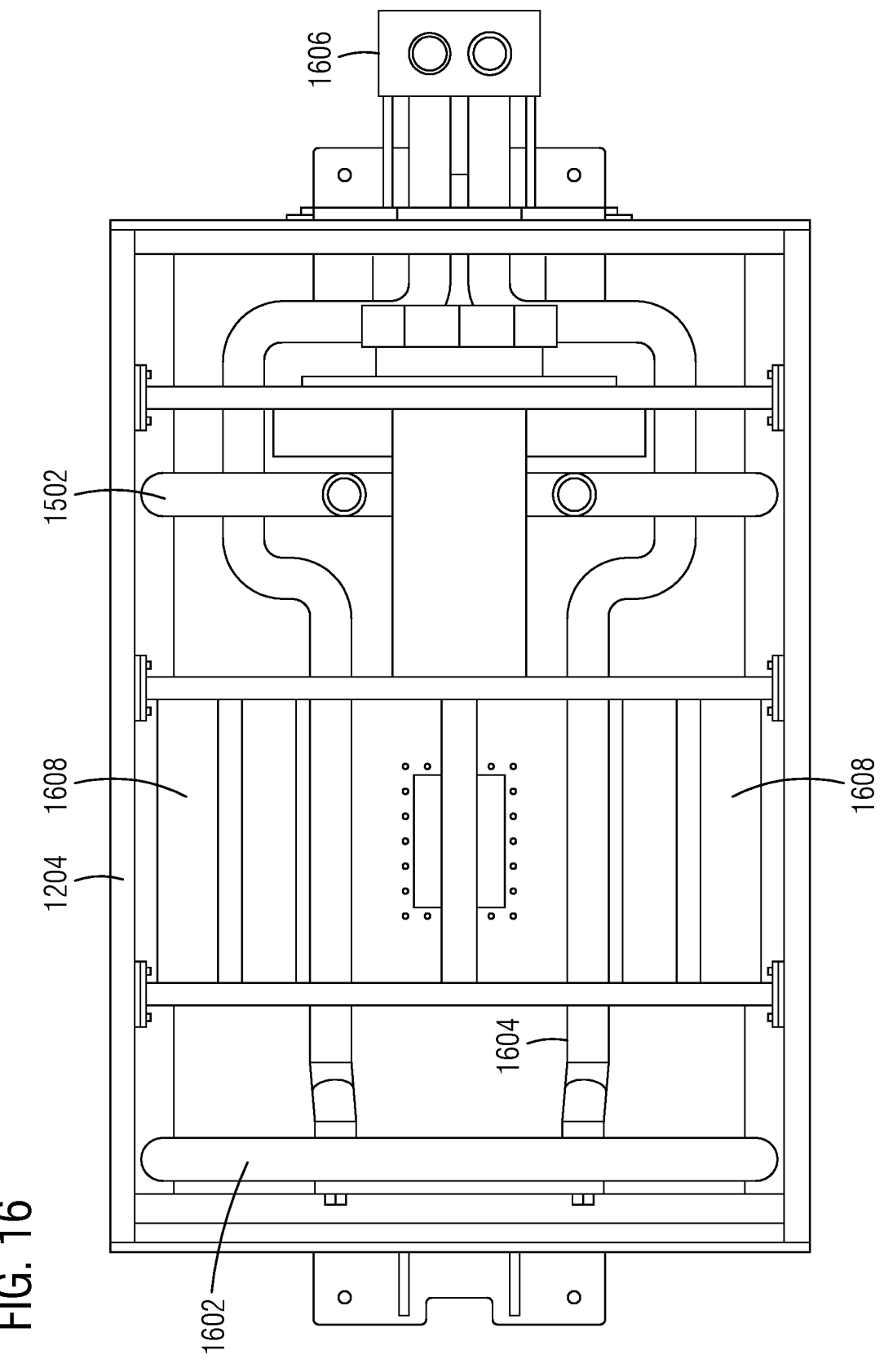
FIG. 16 is a partially broken away view of a stator housing including a portion of the stator cooling circuit of FIG. 15.

FIG. 16 better illustrates the flow paths for the coolant outside of the stator coils 1404. As discussed with regard to FIG. 15, the inlet manifold 1502 receives the cold coolant for distribution to the stator coils 1404. After the coolant passes through the stator coils 1404 it is collected in the outlet manifold 1602. The outlet manifold 1602, is similar to the inlet manifold 1502 in that it forms a partial circular arc to allow for easy collection or distribution from/to the various stator coils 1404. Of course, other shapes or arrangements could be employed.

After collecting in the outlet manifold 1602, the now hot coolant flows through one or more transfer pipes 1604 to a return flange 1606. In the illustrated construction, the transfer pipes 1604 pass through the stator housing 1204 and the return flange 1606 is positioned outside of the stator housing 1204. However, other arrangements may position the return flange 1606 inside of the stator housing 1204.

One or more exhaust pipes 1608 extend between a first end and a second end of the stator core 1302. Each exhaust pipe 1608 is a generally cylindrical pipe sized to pass the cooling gas from one end of the stator core 1302 to the other end of the stator core 1302 without directly cooling the stator core 1302.

Figure 17:
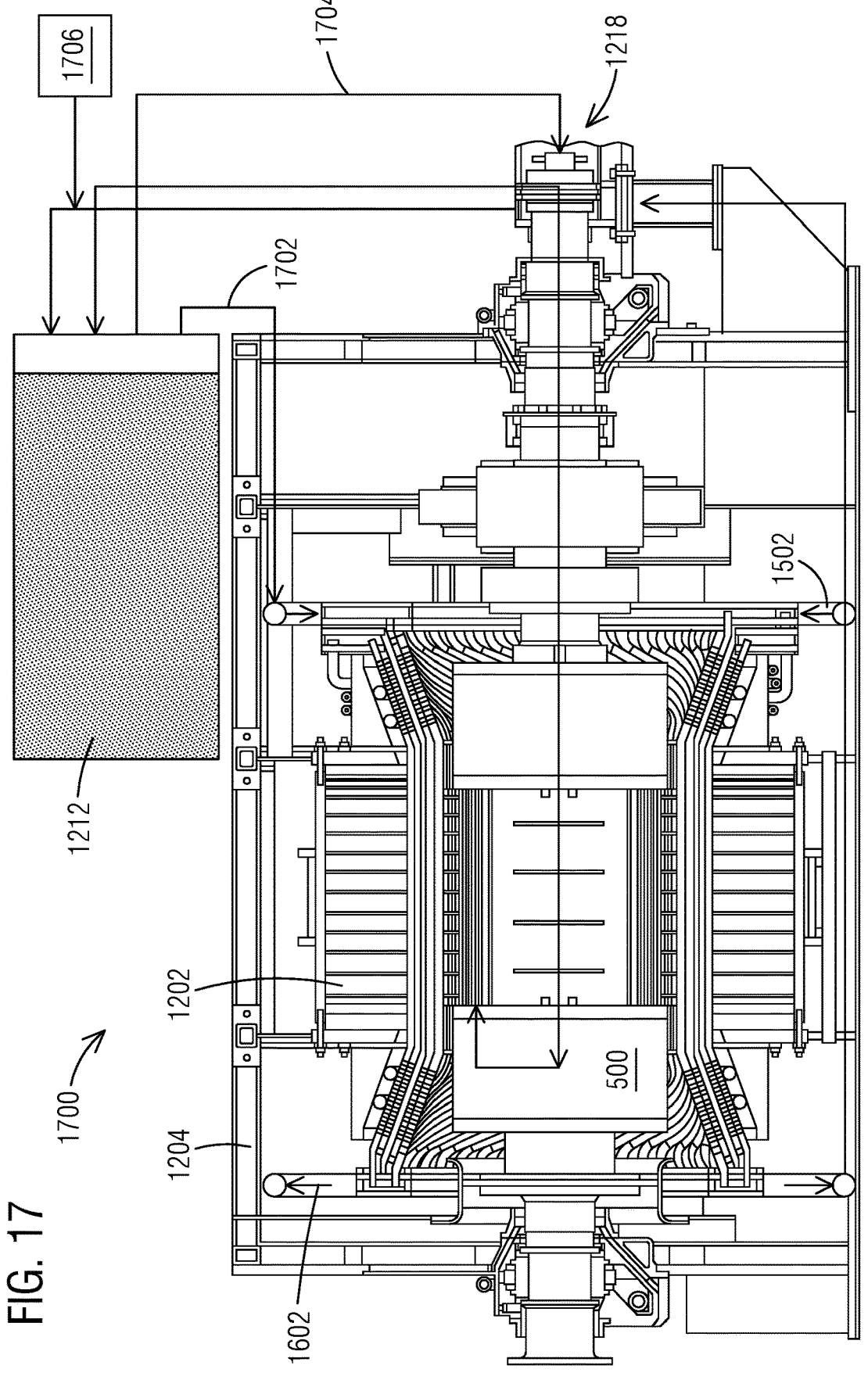
FIG. 17 is a cross-sectional view of the electric machine of FIG. 13 illustrating a high-pressure cooling system for the rotor and/or the stator.
Figure 18:
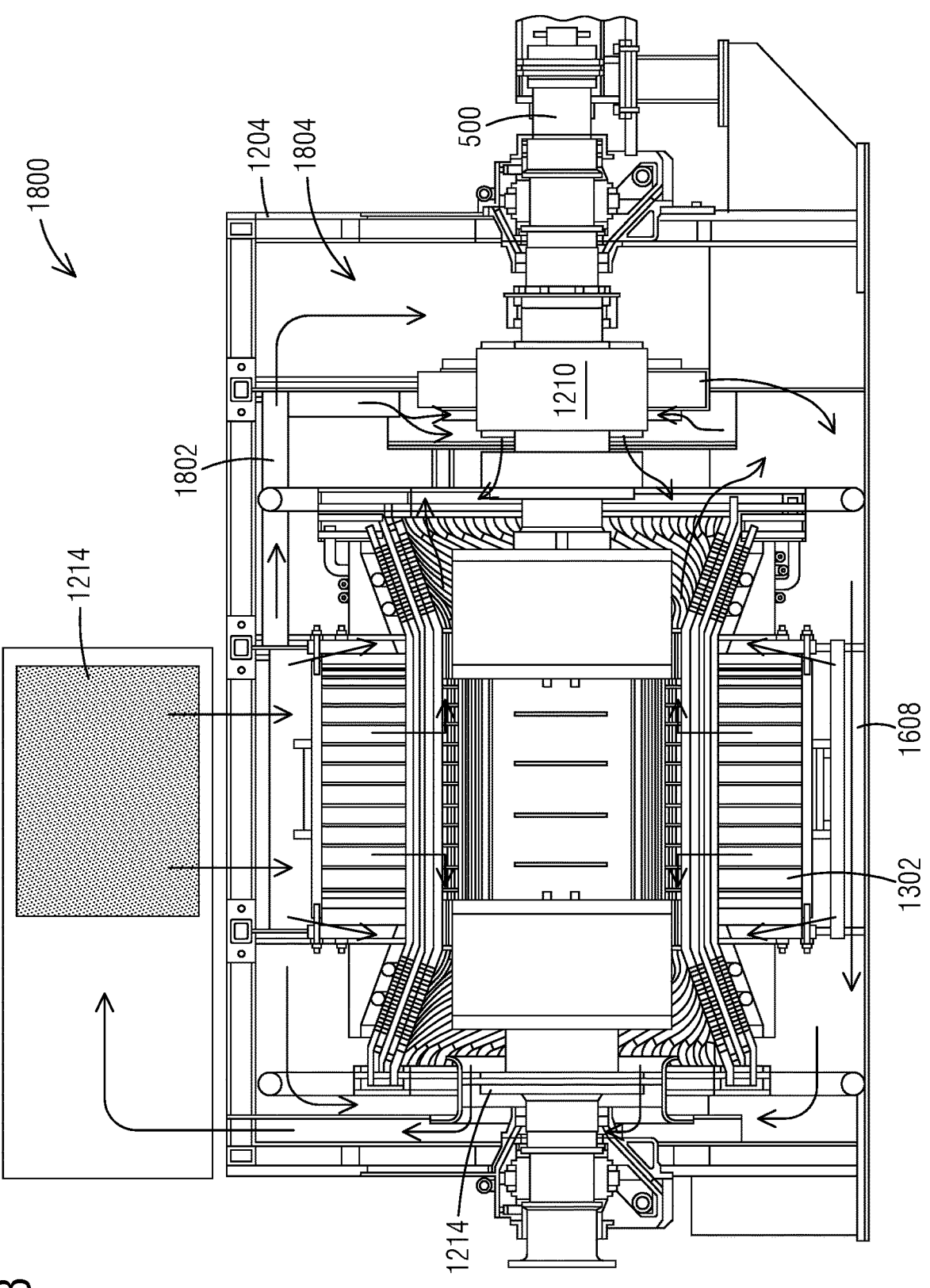
FIG. 18 is a cross-sectional view of the electric machine of FIG. 13 illustrating the low-pressure cooling circuit.

FIG. 17 and FIG. 18 together illustrate a cooling system for the electric machine 1200 that includes a high-pressure cooling system 1700 and a low-pressure cooling circuit 1800. The high-pressure cooling system 1700 is arranged to directly cool the stator coils 1404 that make up the stator winding 1304 and the rotor winding 204. Specifically, a first cooling circuit 1702 is provided to cool the stator coils 1404 and a second cooling circuit 1704 is provided to cool the rotor winding 204. Before proceeding, it should be noted that the term "high-pressure" as used herein with regard to the cooling system refers to a gauge pressure within the high-pressure cooling system 1700 that is sufficient to move the cooling fluid, typically air through the high-pressure cooling system 1700 at a desired flow rate. In most constructions, the desired flow rate of the first cooling circuit 1702 and the second cooling circuit 1704 are independent of one another and are selected to achieve the necessary cooling for the application. The actual pressure within the first cooling circuit 1702 and the second cooling circuit 1704 is preferably higher than atmospheric pressure (e.g., 2 Bar to 20 Bar) such that the system is pressurized. However, the pump assembly 1218, or an alternative external pump operates to increase the pressure only slightly to achieve the desired flow rates. The actual pressures of the first cooling circuit 1702 and the second cooling circuit 1704 are controlled by an external pressure source such as an instrument air source, an external compressor, or a supply of high-pressure gas.

With reference to FIG. 17, the first cooling circuit 1702 begins at the pump assembly 1218 where the flow of cooling gas, air in this construction, is directed to the first heat exchanger 1212 where the cooling gas is cooled. As noted, the first heat exchanger 1212 can use a number of different cooling sources including air to air, water, or another liquid. Once cooled, the now cold cooling gas exits the first heat exchanger 1212 and flows to the inlet manifold 1502. The inlet manifold 1502 distributes the cooling gas to the stator coils 1404 via the coolant tubes 1504. The cooling gas flows along the length of the stator coils 1404 and cools the stator coils 1404. The now heated cooling gas exits the stator windings 1304 at an opposite end of the stator 1202 via the second set of coolant tubes 1504. The hot cooling gas is collected in the outlet manifold 1602 and then directed toward the opposite end of the electric machine 1200 using one or more of the transfer pipes 1604. The transfer pipes 1604 lead to the return flange 1606 which connects to the pump assembly 1218 to return the hot cooling gas to the pump assembly 1218. The pump assembly 1218, as will be described in greater detail operates to increase the pressure of the cooling air to maintain the desired flow rate through the first cooling circuit 1702.

The portion of the second cooling circuit 1704 through the rotor 500 was described in detail with regard to FIG. 1 through FIG. 11. The second cooling circuit 1704 begins at the pump assembly 1218 where the flow of hot cooling gas, air in this example, is directed to the first heat exchanger 1212 for cooling. The illustrated first heat exchanger 1212 may include three circuits, a cold circuit that operates to cool the cooling air in the other two circuits with one of those circuits including cooling air for the first cooling circuit 1702 and the other circuit including cooling air for the second cooling circuit 1704. In this way, the first heat exchanger 1212 cools two separate flows of cooling air without mixing the air. Of course, other constructions could include separate heat exchangers or could combine the flows for cooling within the first heat exchanger 1212 and then separate them before they enter the electric machine 1200 such that the first heat exchanger 1212 includes only two circuits.

Upon exiting the first heat exchanger 1212 the now cooled cooling gas within the second cooling circuit 1704 is directed into the rotor inlet bore 504. The cooling gas flows to the far end of the rotor 500 and then flows through the rotor core, and specifically the rotor winding 204 as previously described to cool the rotor winding 204. The hot cooling gas exits the rotor winding 204, enters the discharge annulus 506 defined by the annular sleeve 522, and returns to the pump assembly 1218. The pump assembly 1218 operates to increase the pressure of the cooling air to maintain the desired flow rate through the second cooling circuit 1704 with the desired flow rate selected at least in part to achieve a desired current density of at least 5 A/mm² and more preferably between 6 and 10 A/mm².

In constructions that include a first heat exchanger 1212 having only two circuits (i.e., a cold circuit and a hot circuit), the hot cooling gas enters as a single flow, is cooled within the first heat exchanger 1212 and then exits the first heat exchanger 1212 where it is divided into two flows, one for the first cooling circuit 1702 and one for the second cooling circuit 1704.

During operation, cooling gas (air) may leak from the first cooling circuit 1702 and/or the second cooling circuit 1704. Make-up air could be provided from a gas supply 1706 which might include external gas storage, instrument air, or other sources of clean cooling gas.

Turning to FIG. 18, the low-pressure cooling circuit 1800 is arranged to provide additional cooling gas, air in this example to cool the components of the electric machine 1200 disposed within the stator housing 1204. While the high-pressure cooling system 1700 is a closed system that includes multiple enclosed flow paths in one or more closed loops, the low-pressure cooling circuit 1800 is an open system in which the cooling gas is free to flow within a space that is not fully closed or sealed. The low-pressure cooling circuit 1800 begins by rotation of the fan 1216 with the rotor 500. The fan 1216 is fixedly attached to the rotor 500 and rotates therewith to produce a flow of low-pressure cooling air with an external fan being a suitable alternative in some applications. The low-pressure cooling air flows from the fan 1216 to the second heat exchanger 1214 where it is cooled in a manner similar to that described with regard to the first heat exchanger 1212. The second heat exchanger 1214 discharges the cooled low-pressure cooling air to a space that contains the stator core 1302. A portion of the low-pressure cooling air flows through the stator core 1302 to cool the stator core 1302. This portion of cooling air is discharged into the stator bore 1220 where it then flows toward each end of the stator 1202. Any of the low-pressure cooling air that does not pass through the stator core 1302 is directed through one or more low-pressure cooling ducts 1802 that lead to an excitation system space 1804 within the stator housing 1204. The low-pressure cooling air within the excitation system space 1804 provides cooling for the excitation system 1210 as well as any other components that might be disposed within the excitation system space 1804 (e.g., permanent magnet generator (PMG)). The low-pressure cooling air within the excitation system space 1804 flows back to the fan 1216 via one or more of the exhaust pipes 1608 formed within the stator housing 1204. Alternatively, this low-pressure cooling circuit could reverse the flow direction by reversing the direction in which the fan discharges (i.e., the fan direction).

Figure 19:
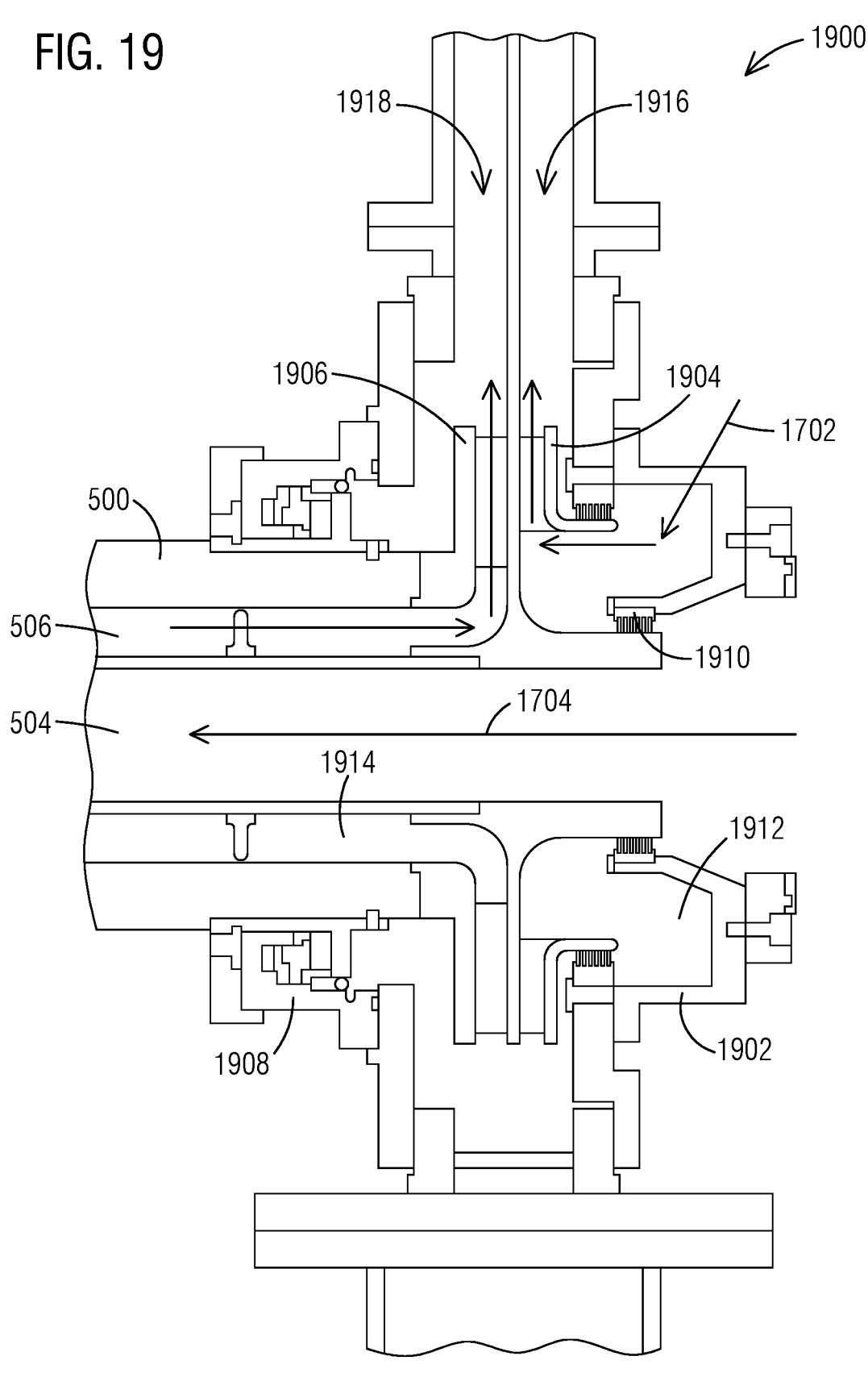
FIG. 19 is a cross-sectional view of a pump arrangement for use in cooling an electric machine.

FIG. 19 illustrates a rotor-mounted pump assembly 1900 that is suitable for use as a pump assembly 1218. The rotor-mounted pump assembly 1900 includes a pump housing 1902 that encloses a first pump impeller 1904 and a second pump impeller 1906. The illustrated first pump impeller 1904 and second pump impeller 1906 are closed centrifugal impellers with other types of impellers being possible. The first pump impeller 1904 and the second pump impeller 1906 are directly mounted in a back-to-back arrangement onto the rotor 500 for co-rotation therewith. Of course, other arrangements or attachments could be employed if desired.

A primary seal 1908 is coupled to the pump housing 1902 and forms a seal between the pump housing 1902, which is stationary, and the rotating rotor 500. The primary seal 1908 includes a gas seal arrangement but could include a number of different arrangements as required to provide the desired seal efficiency. A number of secondary seals 1910 are positioned between the pump housing 1902 and the rotor 500, the first pump impeller 1904, and the second pump impeller 1906 to establish the desired seals and independent flow paths.

With the arrangement of the rotor-mounted pump assembly 1900 illustrated in FIG. 19, rotation of the rotor 500 rotates both the first pump impeller 1904 and the second pump impeller 1906. The first pump impeller 1904 draws in hot cooling gas (air) from the first cooling circuit 1702 which has been directed to a first hot gas return space 1912. The first pump impeller 1904 compresses, pumps, or blows the hot cooling gas out of the rotor-mounted pump assembly 1900 via a first hot gas outlet 1916. The first hot gas outlet 1916 leads to the first heat exchanger 1212 where the hot cooling gas is cooled.

The second pump impeller 1906 draws in hot cooling gas (air) from the second cooling circuit 1704 which has been directed to a second hot gas return space 1914. The second pump impeller 1906 compresses, pumps, or blows the hot cooling gas out of the rotor-mounted pump assembly 1900 via a second hot gas outlet 1918. The second hot gas outlet 1918 leads to the first heat exchanger 1212 where the hot cooling gas is cooled.

Figure 20:
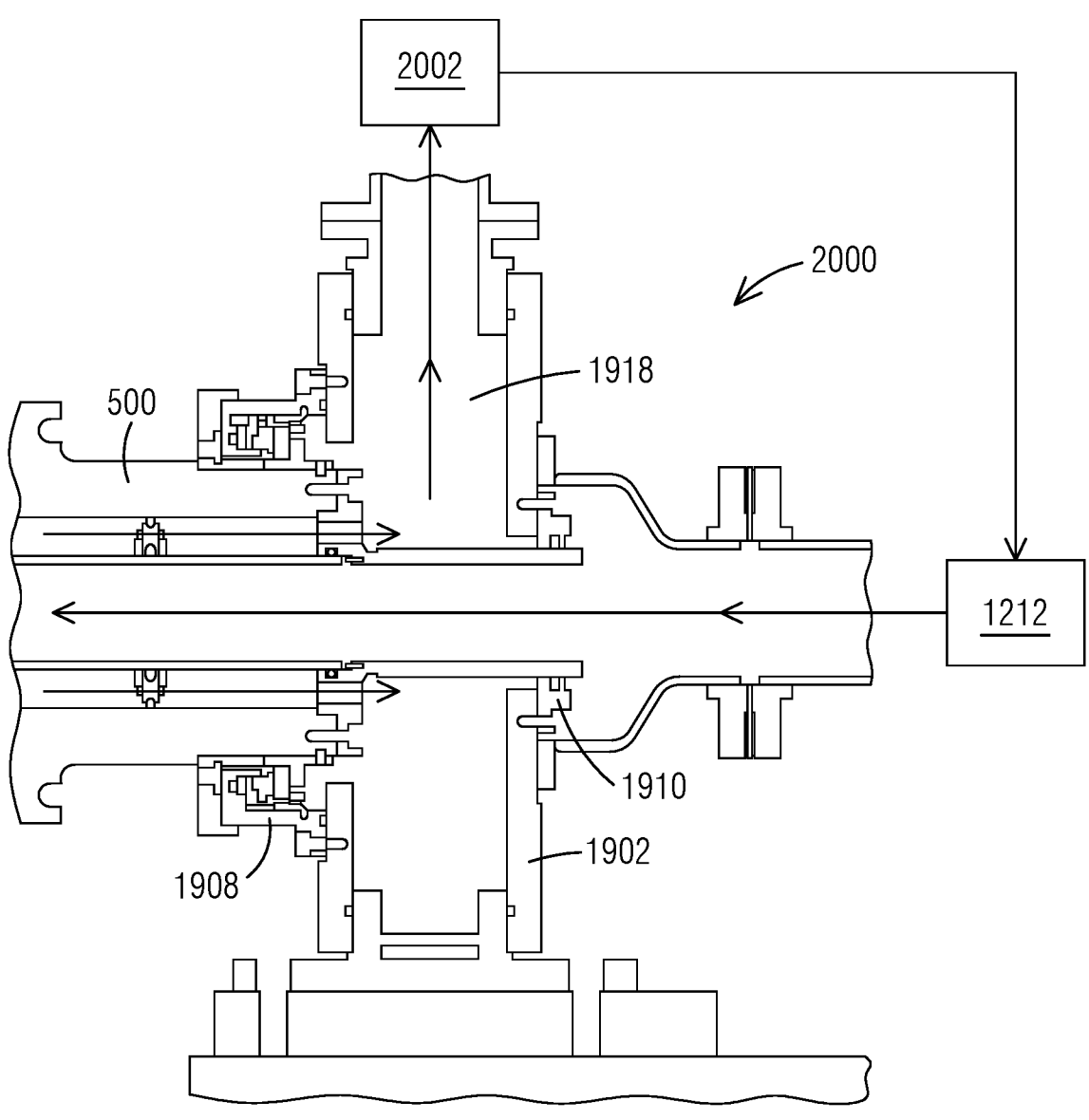
FIG. 20 is a cross-sectional view of another pump arrangement for use in cooling an electric machine.

FIG. 20 illustrates an external pump assembly 2000 that is also suitable for use as part of the pump assembly 1218. The external pump assembly 2000 includes a pump housing 1902 that surrounds a portion of the rotor 500. A primary seal 1908 similar to the primary seal 1908 of FIG. 19 and a secondary seal 1910 similar to those described with regard to FIG. 19 are provided to form a seal between the rotating rotor 500 and the stationary pump housing 1902. The pump housing 1902 defines a second hot gas outlet 1918 that captures the hot cooling gas from the second cooling circuit 1704 and directs it to the first heat exchanger 1212.

Rather than employing shaft-mounted impellers as illustrated in FIG. 19, the construction of FIG. 20 includes an external pump 2002 (sometimes referred to as a compressor or a blower). The external pump 2002 receives the flow of cooled cooling gas from the first heat exchanger 1212, increases the pressure or flow rate of that cooling gas and directs it into the rotor inlet bore 504. Another external pump 2002 may be provided to compress or pump the cooling gas in the first cooling circuit 1702. The external pump for the first cooling circuit 1702 is much simpler since there is no requirement to form a seal between a stationary portion and a rotating portion as is required with the second cooling circuit 1704 as the first cooling circuit 1702 includes components that do not move significantly with respect to one another.

It should be noted that there are a number of possible variations in the arrangement of the pump assembly 1218 and the first heat exchanger 1212. For example, the rotor-mounted pump assembly 1900 could be employed as a pump assembly 1218 or a completely externally driven system such as the external pump assembly 2000 illustrated in FIG. 20 could be employed. In other constructions, one of the first cooling circuit 1702 and the second cooling circuit 1704 includes a shaft-mounted pump and the other of the first cooling circuit 1702 and the second cooling circuit 1704 includes an external pump. In addition, the pumps, regardless of the configuration could be located at different points within their respective cooling circuits as may be desired.

Additionally, the first hot gas outlet 1916 and the second hot gas outlet 1918 could be combined into a single flow which could be produced by one or more external pumps, one or more shaft-mounted impellers, or a combination thereof.

The first heat exchanger 1212 could also include several different arrangements. In the construction illustrated in FIG. 17, the first heat exchanger 1212 includes a first internal circuit or loop for cold fluid and two separate internal circuits or loops for hot fluid. The first cooling circuit 1702 includes the first of the hot fluid loops within the first heat exchanger 1212 and the second cooling circuit 1704 includes the second of the hot fluid loops. Thus, in this arrangement, the cooling fluids of the first cooling circuit 1702 and the second cooling circuit 1704 do not mix but are cooled by a common cold fluid circuit.

In another arrangement, the heat exchanger includes one cold fluid loop and one hot fluid loop. In this arrangement, the first cooling circuit 1702 and the second cooling circuit 1704 combine into a single flow before entry into the first heat exchanger 1212. After passing through the first heat exchanger 1212, the single flow is again split into the first cooling circuit 1702 and the second cooling circuit 1704. In this arrangement, a controllable valve or orifice may be required to achieve the desired flow through the two cooling circuits.

In still other constructions, two completely separate heat exchangers could be employed with each heat exchanger associated with one of the first cooling circuit 1702 and the second cooling circuit 1704. Other arrangements of the pumps and heat exchangers are also possible.

Figure 21:
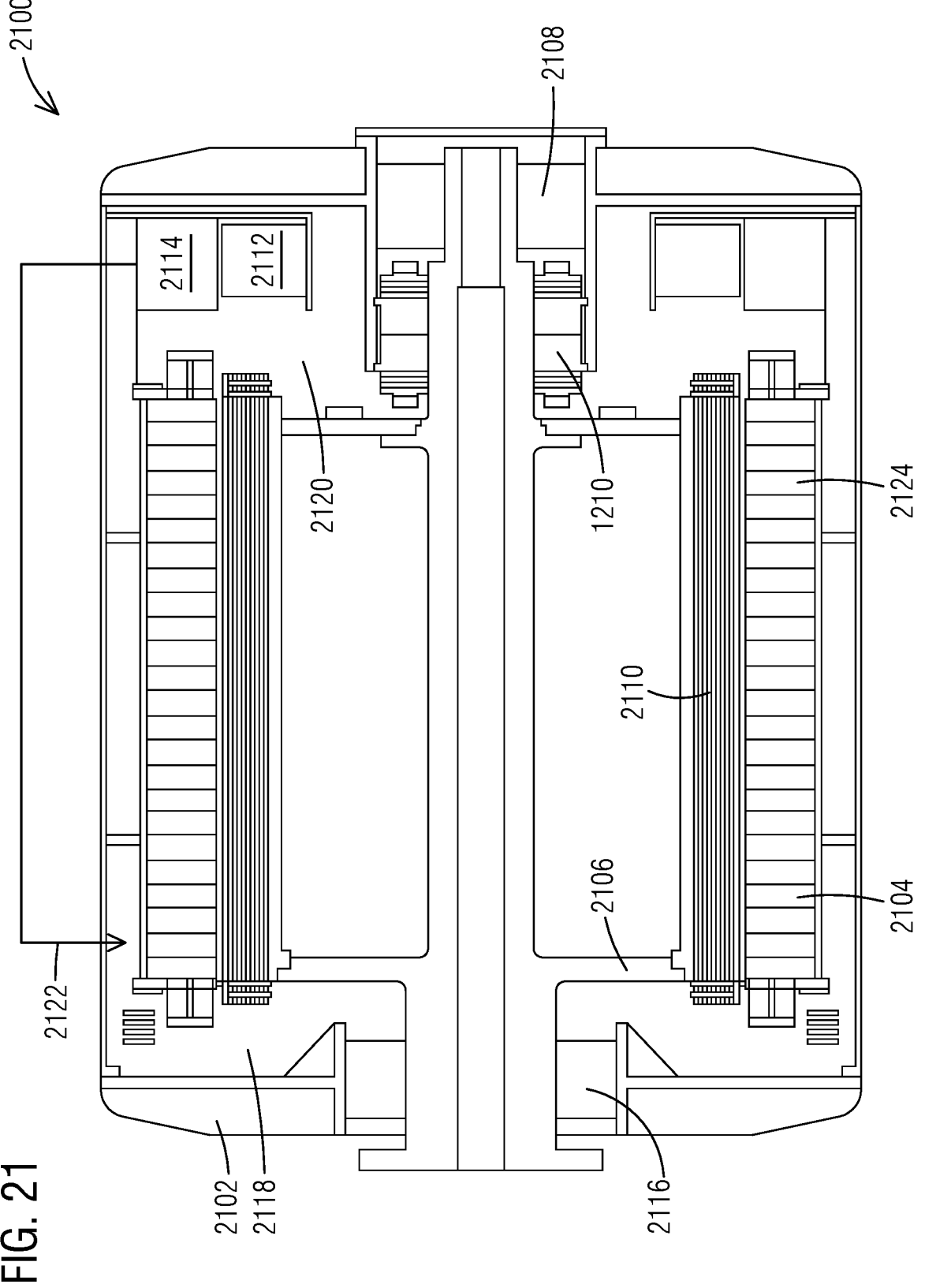
FIG. 21 is a schematic cross-section of a low-speed electric machine.

FIG. 21 illustrates a low-speed electric machine 2100 that could be operated as a generator to generate electricity or as a motor to drive another device such as a propeller, compressor, pump, or the like. The low-speed electric machine 2100 includes a number of features adapted for operation at a speed below 1200 RPM while still providing high current density (i.e., greater than 5 $A/mm^2$ or between 6 and 10 $A/mm^2$).

The low-speed electric machine 2100 includes a stator housing 2102, a stator 2104, and a rotor 2106. The stator housing 2102 is arranged to contain and protect the stator 2104 and to define a first space 2118 and a second space 2120.

The stator housing 2102 supports a first bearing 2116 and a second bearing 2108 that are arranged to support the rotor 2106 for rotation. As has been discussed, the rotor 2106 includes a rotor winding 2110 that cooperates with the stator winding 2124 to generate electricity when operated as a generator or to generate mechanical torque when operated as a motor. An excitation system 1210 (e.g., an exciter) is positioned within the stator housing 2102 between the 2116 and the 2108 as has been previously described.

The low-speed electric machine 2100 includes a cooling system that operates to cool the rotor 2106 and the stator 2104 and more particularly the rotor winding 2110 and the stator housing 1204. The cooling system includes a fan 2112, a heat exchanger 2114, and a return path 2122. The fan 2112 is preferably positioned in the second space 2120 such that during operation it draws air from the second space 2120 and discharges that air to the heat exchanger 2114. Because the rotor 2106 operates at a low speed, it cannot effectively directly drive the fan 2112. The fan 2112 could be driven by the generator if a gearbox or other device is employed to increase the speed and efficiency of the fan 2112. Alternatively, the fan 2112 can be electrically driven or could be mechanically driven by a separate motor.

The heat exchanger 2114 is positioned within the stator housing 2102 but alternatively could be positioned on the exterior of the stator housing 2102. The heat exchanger 2114 receives a flow of cooling air from the fan 2112 and discharges the cooled cooling air to the return path 2122 which directs the air from the 2114 to the first space 2118.

In operation, cooling air within the first space 2118 flows through the rotor winding 2110 and the stator winding 2124 to provide cooling. The air then exits the rotor winding 2110 and the stator winding 2124 and collects in the second space 2120. The fan 2112 operates to draw the hot cooling air from the second space 2120 and directs it to the heat exchanger 2114. The heat exchanger 2114 receives a flow of cooling fluid that operates to cool the air delivered by the fan 2112. The cooling fluid could be external air, or another fluid such as water as may be necessary to provide the desired cooling.

In one arrangement, a refrigeration system is provided to provide the desired cooling. The air cooled by the heat exchanger 2114 then returns along the return path 2122 to the first space 2118 to begin the cycle again.

It should be noted that while the return path 2122 is illustrated as being outside of the stator housing 2102, some constructions may position the return path 2122 completely or partially within the stator housing 2102.

In operation, the excitation system 1210 or other system provides current at a desired voltage to the rotor 200. The current flows through the rotor windings 204 to establish two magnetic poles in a two-pole generator/motor and more poles in higher pole generators/motors. The turbine, other prime mover, or component to be driven (e.g., propeller) is coupled to the rotor 200 and operates to rotate or be driven by the rotor 200 at a desired speed. For a synchronous electric machine 1200 with a two-pole rotor 200, the rotor is rotated at 3600 RPM to generate 60 Hz electricity. For electricity at 50 Hz, the rotor 200 is rotated at 3000 RPM. Variations of this could include constant or variable speed machines operating from 1 RPM to 20,000 RPM.

When the electric machine 1200 operates as a generator, the rotating magnetic field of the rotor 200 interacts with the stator 300 of the generator to induce an alternating three-phase current at a frequency that is proportional to the speed of the rotor 200. Each of the rotor 200 and the stator 300 can be cooled to increase the current density of the rotor 200 and the stator 300, while also maintaining a desired efficiency and maintenance interval.

The rotor 500 includes a rotor cooling system 520, 1704 and is assembled, or re-assembled after maintenance by first positioning the coils or rotor windings 204 in the various rotor slots 202. The rotor windings 204 are stacked to extend radially outward to substantially fill the rotor slots 202 and are electrically connected to define one of the poles of the rotor 500.

Because the wedges 410, 810, 1008, 1102 are substantially the same as one another, the assembly will be described with regard to the wedge 1102. However, it should be clear that many of the steps are equally applicable to some or all of the other wedges 410, 810, 1008, 1102.

The seal members 608 are positioned on the sides of the various wedges 1102 (see FIG. 6). As described, the seal members 608 are D-shaped and in some constructions, the flat side of the D-shape includes an adhesive that facilitates the attachment of the seal members 608 to the wedge 1102.

The seal members 608 are located radially inside the wedge hooks 606 and therefore are inserted into each wedge 1102 before assembly into the rotor slots 202. This location of the seal members 608 increases the likelihood that the seal members 608 would be contained within the rotor slot 202 in the event of degradation or failure of the one of the seal members 608. The position of the seal members 608 further from the outer surface of the rotor 500 also aids in shielding the seal members 608 from large temperature excursions that may occur due to surface currents or other heating effects. The seal members 608 also aid in isolating the rotor windings 204 from the wedge hook 606 such that any conductive wedge plating material that might be loosened during wedging is blocked from the rotor windings 204, thereby reducing the likelihood of a ground fault from this material.

The wedges 1102 are next installed in the various rotor slots 202 to support the rotor windings 204 in the desired position during operation. The seal members 608 are compressed against the walls of the rotor body 120 that define the rotor slot 202 in which each wedge 1102 is installed, thereby forming a primary seal in each of the rotor slots 202. The contact pressure between the wedge hook 606 and the tooth hook 604 of each rotor slot 202 also acts as a secondary seal to inhibit unwanted leakage out of the rotor slots 202. Thus, the installation of the wedges 1102 provides an axially disposed seal that inhibits leakage from the radial outer opening of the rotor slots 202. However, each end of the rotor slots 202 are still unsealed.

The wedge 1102 requires some additional assembly that may not be required with the other wedges 410, 810 and this assembly can be performed prior to the installation of the wedge 1102 in the rotor 500 or after, as may be desired. Each end of the wedge 1102 receives a wedge insert 1002. Next, a wedge cap 1004 is positioned adjacent each of the wedge inserts 1002. Each of a plurality of wedge bolts 1006 passes through one of the wedge caps 1004 and the wedge inserts 1002 and threadably engages the wedge body 1104. Tightening of the wedge bolts 1006 compresses the wedge inserts 1002 axially which simultaneously expands the wedge inserts 1002 radially and circumferentially. The expansion of the wedge insert 1002 facilitates cooperation between the wedge body 1104, the retaining ring 114 (after it is installed) or the ring seal 808, and the rotor teeth 402 to further enhance the seal therebetween. It should be noted that the wedge insert 1002 and the wedge cap 1004 could be installed on the wedge body 1104 without tightening the wedge bolt 1006. Then after the wedge 1102 is in its operating position, the wedge bolts 1006 can be tightened to provide the desired compression of the wedge inserts 1002.

With reference to FIG. 10, the ring seals 808 are next positioned on each end of the rotor 500. Both the ring seals 808 are preferably continuous circular seals that extend around the circumference of the rotor 500 and engage the rotor teeth 602 as well as the wedges 1102. The ring seal 808 is positioned radially outward of the wedge insert 1002 and can be positioned prior to the tightening of the wedge bolts 1006 or after the tightening of the wedge bolts 1006. Generally, positioning the ring seal 808 in its desired operating position prior to the tightening of the wedge bolts 1006 will be easier, as the ring seal 808 will have a slightly looser fit before the expansion of the wedge inserts 1002.

It should be noted that FIG. 11 illustrates a slightly different position of the ring seal 702 and also employs the ring seal 702 of FIG. 7, rather than the ring seal 808 of FIG. 8. It is important to note that the concepts described herein can be re-arranged and used in different combinations to achieve the necessary sealing for the particular design. As such, the sealing arrangements described should be thought of only as examples and should not be considered limiting in any way.

Next, the retaining rings 114 are installed as illustrated in FIG. 10 and FIG. 11. In a typical installation, the retaining rings 114 are heated prior to installation to thermally expand the retaining rings 114 to provide a desired shrink fit at one or more shrink-fit locations 1106. Once installed, the retaining rings 114 cooperate with the rotor body 120, the rotor shaft 122, and the end plates 514 to define the first coolant space 512 and the second coolant space 508.

As illustrated in FIG. 11, the retaining ring 114 cooperates with each wedge body 1104 to define three shrink-fit locations 1106 that form seals. In addition, the ring seal 702 cooperates with the retaining ring 114 and the wedge body 1104 to define the primary seal. Finally, the wedge insert 1002, once expanded provides yet another seal point between the rotor 500 and the retaining rings 114 such that there are multiple effective seal points to inhibit leakage from the first coolant space 512 and the second coolant space 508.

With reference to FIG. 5, the operation of the rotor cooling system 520 will be described. During rotation of the rotor 500, the coolant pump 502, 1218 draws warm air from the discharge annulus 506 and directs that air to an outside air cooler or heat exchange 1212. The cooled air then flows along the inlet bore 504 to the inlet apertures 516 where the high-pressure air (generally greater than atmospheric pressure) is admitted to the first coolant space 512. The first coolant space 512 is in fluid communication with each of the rotor slots 202 such that high pressure air may enter the rotor slots 202. The high-pressure air flows the length of the rotor slots 202 to provide cooling and is collected in the second coolant space 508. The high-pressure air is directed from the second coolant space 508 to the discharge annulus 506 where it is drawn into the coolant pump 502, 1218 and discharged from the rotor 500. The seals described above reduce the likelihood of leakage form the first coolant space 512, the second coolant space 508, and the rotor slots 202.

The proposed high current density electric machine makes the rotor 500 the pressure vessel, where each rotor slot 202, first coolant space 512, and the second coolant space 508 are pressurized. The wedges 410, 810, 1008, 1102 include two compliant seal members 608 which are in contact with the side walls of the rotor slot 202. These seal members 608 ensure the rotor slots 202 are leak tight.

The pressurized rotor slots 202 allow direct cooling of the rotor windings 204 with high-pressure fluid without increased friction loss and without many complex, dual purpose electrical/fluid connections. Direct cooling with pressurized fluid allows machine operation with increased field currents, and ultimately higher current density than prior air-cooled machines.

The use of a high-pressure cooling system 1700 in combination with the low-pressure cooling circuit 1800 to cool the stator 1202 allows for a more compact stator 1202 and increases the current density of the electric machine 1200. Specifically, the electric machine 1200 illustrated herein results in electric machines that operate in the 1 MW to 50 MW range with a current density exceeding 5 A/mm$^2$ and in many constructions between 6 and 10 A/mm$^2$ which in some constructions can yield a power density at 3600 RPM of at least 1.0 kW/kg.

The current density is measured at the smallest cross-sectional area of the conductors in the rotor winding and the stator winding. Thus, each of the rotor and the stator has a current density and, in most constructions described herein those current densities are greater than 5 A/mm$^2$ with most falling between 6 and 10 A/mm$^2$.

In addition, the placement of the excitation system 1210 between the first bearing 1206 and the second bearing 1208 allows for a shortened rotor 500 as well as enhanced cooling of the excitation system 1210. Also, the placement of the excitation system 1210 between the first bearing 1206 and the second bearing 1208 allows the pump assembly 1218 to be positioned closer to the first bearing 1206. This positioning reduces vibration and runout in the pump assembly 1218 which in turn allows for a more effective sealing between the pump housing 1902 and the rotor 500.

Although an exemplary embodiment of the present disclosure has been described in detail, those skilled in the art will understand that various changes, substitutions, variations, and improvements disclosed herein may be made without departing from the spirit and scope of the disclosure in its broadest form. In addition, any feature described with respect to one embodiment is equally applicable to other embodiments described herein.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. An electric machine comprising:
a stator including a stator bore and a stator winding, the stator winding arranged to one of receive an electrical current and produce an electrical current having a power between 1 MW and 50 MW, the stator having a stator current density of greater than 5 A/mm²;
a rotor at least partially disposed within the stator bore and having a rotor winding, the rotor having a rotor current density of greater than 5 A/mm²; and
a high-pressure cooling system operable to actively cool the stator and the rotor, wherein the rotor winding and the stator winding interact to one of produce rotation of the rotor to drive a connected device in response to the receipt of the electrical current and produce the electrical current in response to rotation of the rotor driven by the connected device, wherein the high-pressure cooling system includes a first cooling circuit operable to cool the stator winding with a first flow of high-pressure fluid, and a second cooling circuit operable to cool the rotor winding with a second flow of high-pressure fluid, the first flow of high pressure fluid separate from the second flow of high-pressure fluid.

2. The electric machine of claim 1, wherein the rotor current density and the stator current density are each between 6 and 10 A/mm².

3. The electric machine of claim 1, further comprising a stator housing that encloses the stator, the stator housing including a first bearing and a second bearing, and wherein the rotor is supported for rotation by the first bearing and the second bearing.

4. The electric machine of claim 3, further comprising an excitation system operable to provide an excitation current to the rotor winding, the excitation system supported for rotation by the rotor and disposed between the first bearing and the second bearing.

5. The electric machine of claim 4, further comprising a low-pressure cooling circuit that includes a low-pressure flow of air within the stator housing and operable to at least partially cool the excitation system and the stator.

6. The electric machine of claim 5, wherein the low-pressure cooling circuit includes a fan coupled to the rotor and operable to produce the low-pressure flow of air.

7. The electric machine of claim 1, wherein the first cooling circuit includes a first heat exchanger operable to cool the first flow of high-pressure fluid and the second flow of high-pressure fluid.

8. The electric machine of claim 1, wherein the first cooling circuit includes a first rotor-mounted pump operable to increase the pressure of the first flow of high-pressure fluid and a second rotor-mounted pump operable to increase the pressure of the second flow of high-pressure fluid.

9. The electric machine of claim 1, wherein the second cooling circuit includes a first rotor-mounted pump operable to increase the pressure of the second flow of high-pressure fluid and an external pump separate from the rotor and operable to increase the pressure of the first flow of high-pressure fluid.

10. The electric machine of claim 1, wherein the first cooling circuit includes a first external pump and a second external pump each separate from the rotor, the first external pump operable to increase the pressure of the first flow of high-pressure fluid and the second external pump operable to increase the pressure of the second flow of high-pressure fluid.

11. The electric machine of claim 1, wherein each of the first cooling circuit and the second cooling circuit are closed loops and wherein the first flow of high-pressure fluid and the second flow of high-pressure fluid includes air.

12. An electric machine comprising:
a stator including a stator bore and a stator winding;
a rotor at least partially disposed within the stator bore and having a rotor winding;
a first cooling circuit operable to cool the stator winding with a first flow of high-pressure fluid; and
a second cooling circuit operable to cool the rotor winding with a second flow of high-pressure fluid, the first cooling circuit and the second cooling circuit separate from one another and each defining a separate closed system.

13. The electric machine of claim 12, wherein the stator winding is arranged to one of receive an electrical current and produce an electrical current having a power between 1 MW and 50 MW, and wherein the rotor defines a rotor current density that is greater than 5 A/mm² and the stator defines a stator current density that is greater than 5 A/mm².

14. The electric machine of claim 13, wherein the rotor current density and the stator current density are each between 6 and 10 A/mm².

15. The electric machine of claim 12, further comprising a stator housing that encloses the stator, the stator housing including a first bearing and a second bearing, and wherein the rotor is supported for rotation by the first bearing and the second bearing.

16. The electric machine of claim 15, further comprising a low-pressure cooling circuit that includes a low-pressure flow of air within the stator housing and operable to at least partially cool the excitation system and the stator.

17. The electric machine of claim 16, wherein the low-pressure cooling circuit includes a fan coupled to the rotor and operable to produce the low-pressure flow of air.

18. The electric machine of claim 16, further comprising a first heat exchanger operable to cool the first flow of high-pressure fluid and the second flow of high-pressure fluid, and a second heat exchanger operable to cool the low-pressure flow of fluid.

19. The electric machine of claim 12, wherein the first cooling circuit includes a first rotor-mounted pump operable to increase the pressure of the first flow of high-pressure fluid and a second rotor-mounted pump operable to increase the pressure of the second flow of high-pressure fluid.

20. The electric machine of claim 12, wherein the first cooling circuit includes a first rotor-mounted pump operable to increase the pressure of the second flow of high-pressure fluid and an external pump separate from the rotor and operable to increase the pressure of the first flow of high-pressure fluid.

21. The electric machine of claim 12, wherein each of the first cooling circuit and the second cooling circuit are closed loops and wherein the first flow of high-pressure fluid and the second flow of high-pressure fluid includes air.

22. An electric machine comprising:

a stator including a stator bore and a stator winding;

a stator housing arranged to enclose the stator and including a first wall that supports a first bearing and a second wall that supports a second bearing;

a rotor at least partially disposed within the stator bore and having a rotor winding, the rotor supported for rotation by the first bearing and the second bearing;

an excitation system coupled to the rotor and disposed within the stator housing between the first bearing and the second bearing, the excitation system operable to provide an excitation current to the rotor winding;

a high-pressure cooling system including a first cooling circuit operable to cool the stator winding with the first flow of high-pressure fluid, and a second cooling circuit operable to cool the rotor winding with a second flow of high-pressure fluid, the second cooling circuit separate from the first cooling circuit and the first flow of high-pressure fluid separate from the second flow of high-pressure fluid; and a low-pressure cooling circuit that includes a low-pressure flow of air within the stator housing and operable to at least partially cool the excitation system and the stator, wherein the high-pressure cooling system includes a first heat exchanger operable to cool the first flow of high-pressure fluid and a second heat exchanger operable to cool the low-pressure flow of air.

23. The electric machine of claim 22, wherein the stator winding is arranged to one of receive an electrical current and produce an electrical current having a power between 1 MW and 50 MW, and wherein the rotor defines a rotor current density that is greater than 5 A/mm$^2$ and the stator defines a stator current density that is greater than 5 A/mm$^2$.

24. The electric machine of claim 23, wherein the rotor current density and the stator current density are each between 6 and 10 A/mm$^2$.

25. The electric machine of claim 1, wherein the first cooling circuit includes a first rotor-mounted pump operable to increase the pressure of the first flow of high-pressure fluid and a second rotor-mounted pump operable to increase the pressure of the second flow of high-pressure fluid.

26. The electric machine of claim 1, wherein the first cooling circuit includes a first rotor-mounted pump operable to increase the pressure of the second flow of high-pressure fluid and an external pump separate from the rotor and operable to increase the pressure of the first flow of high-pressure fluid.

27. The electric machine of claim 1, wherein each of the first cooling circuit and the second cooling circuit are closed loops and wherein the first flow of high-pressure fluid and the second flow of high-pressure fluid includes air.

* * * * *